US012594967B2

(12) United States Patent
Kumavat et al.

(10) Patent No.: US 12,594,967 B2
(45) Date of Patent: *Apr. 7, 2026

(54) METHOD AND SYSTEM FOR ADDRESSING FAILURE IN AN AUTONOMOUS AGENT

(71) Applicant: Gatik AI Inc., Mountain View, CA (US)

(72) Inventors: Apeksha Kumavat, Palo Alto, CA (US); Brian McLean, Palo Alto, CA (US); Siddharth Ram, Palo Alto, CA (US); Arjun Narang, Palo Alto, CA (US); Gautam Narang, Palo Alto, CA (US)

(73) Assignee: Gatik AI Inc., Mountain View, CA (US)

( * ) Notice: Subject to any disclaimer, the term of this patent is extended or adjusted under 35 U.S.C. 154(b) by 76 days.

This patent is subject to a terminal disclaimer.

(21) Appl. No.: 18/792,340

(22) Filed: Aug. 1, 2024

(65) Prior Publication Data

US 2024/0400104 A1    Dec. 5, 2024

Related U.S. Application Data

(63) Continuation of application No. 18/082,173, filed on Dec. 15, 2022, now Pat. No. 12,091,052.

(Continued)

(51) Int. Cl.
*B60W 60/00* (2020.01)
*B60W 50/02* (2012.01)

(52) U.S. Cl.
CPC .. *B60W 60/00186* (2020.02); *B60W 50/0225* (2013.01); *B60W 60/0015* (2020.02); *B60W 2050/0215* (2013.01)

(58) Field of Classification Search
None
See application file for complete search history.

(56) References Cited

U.S. PATENT DOCUMENTS

| | | | |
|---|---|---|---|
| 5,120,114 A | 6/1992 | Schlichenmaier et al. |
| 5,211,449 A | 5/1993 | Amtsfeld |

(Continued)

FOREIGN PATENT DOCUMENTS

| | | |
|---|---|---|
| JP | 2012531340 A | 12/2012 |
| JP | 2015089801 A | 5/2015 |

(Continued)

OTHER PUBLICATIONS

"F-Series Specification Sheet FFR 600 AMT", Isuzu, www.isuzu.co.za, Jul. 2021.

(Continued)

*Primary Examiner* — Thomas E Worden
*Assistant Examiner* — Bryant Tang
(74) *Attorney, Agent, or Firm* — Jeffrey Schox; Diana Lin

(57) ABSTRACT

A system for addressing failure in an autonomous agent includes a driving subsystem, a control subsystem, a central computing subsystem, and an autonomous vehicle (AV) sensor subsystem. The system can optionally additionally include a power subsystem, a vehicle chassis subsystem, a communication subsystem, a distributed computing and/or processing subsystem, a supplementary sensor subsystem, and/or any other components. A method for addressing failure can include any or all of: detecting and responding to a failure; and operating the vehicle. Additionally or alternatively, the method 200 can include any other processes.

20 Claims, 7 Drawing Sheets

Related U.S. Application Data

(60) Provisional application No. 63/290,407, filed on Dec. 16, 2021.

(56) References Cited

U.S. PATENT DOCUMENTS

| | | | |
|---|---|---|---|
| 5,575,543 | A | 11/1996 | Pheonix |
| 6,048,040 | A | 4/2000 | Ross |
| 6,082,835 | A | 7/2000 | Brearley |
| 6,183,052 | B1 | 2/2001 | Harada et al. |
| 6,278,965 | B1 | 8/2001 | Glass et al. |
| 6,292,830 | B1 | 9/2001 | Taylor et al. |
| 7,230,545 | B2 | 6/2007 | Nath et al. |
| 7,284,802 | B2 | 10/2007 | Ziegler et al. |
| 8,024,112 | B2 | 9/2011 | Krumm et al. |
| 8,737,986 | B2 | 5/2014 | Rhoads et al. |
| 9,507,346 | B1 | 11/2016 | Levinson et al. |
| 10,106,153 | B1 | 10/2018 | Xiao et al. |
| 10,311,336 | B1 | 6/2019 | Kim et al. |
| 10,330,787 | B2 | 6/2019 | Melvin et al. |
| 10,520,940 | B2 | 12/2019 | Palanisamy et al. |
| 10,559,140 | B2 | 2/2020 | Nix et al. |
| 10,860,022 | B2 | 12/2020 | Korchev et al. |
| 10,866,588 | B2 | 12/2020 | Buch et al. |
| 11,027,751 | B2 | 6/2021 | Wray et al. |
| 11,034,364 | B1 | 6/2021 | Narang et al. |
| 11,124,204 | B1 | 9/2021 | Narang et al. |
| 11,157,010 | B1 | 10/2021 | Narang et al. |
| 11,282,013 | B2 | 3/2022 | Rana et al. |
| 11,294,387 | B2 | 4/2022 | Northcutt et al. |
| 11,396,302 | B2 | 7/2022 | Ye et al. |
| 11,454,970 | B2 | 9/2022 | Sujan et al. |
| 11,468,395 | B2 | 10/2022 | Javidan et al. |
| 11,491,979 | B2 | 11/2022 | Wang |
| 11,521,396 | B1 | 12/2022 | Jain et al. |
| 11,685,360 | B2 | 6/2023 | Frazzoli et al. |
| 11,747,155 | B2 | 9/2023 | Wang et al. |
| 11,753,008 | B2 | 9/2023 | Lin et al. |
| 11,774,963 | B2 | 10/2023 | Huang et al. |
| 11,789,456 | B2 | 10/2023 | Tan et al. |
| 12,257,994 | B2 | 3/2025 | Nemeth et al. |
| 2006/0119174 | A1 | 6/2006 | Frashure |
| 2006/0244626 | A1 | 11/2006 | Beyene |
| 2008/0312833 | A1 | 12/2008 | Greene et al. |
| 2009/0306866 | A1 | 12/2009 | Malikopoulos |
| 2010/0131148 | A1 | 5/2010 | Camhi et al. |
| 2012/0035801 | A1 | 2/2012 | Browne et al. |
| 2012/0232733 | A1 | 9/2012 | Herbin et al. |
| 2013/0158801 | A1 | 6/2013 | Tober et al. |
| 2013/0274986 | A1 | 10/2013 | Trepagnier et al. |
| 2015/0100530 | A1 | 4/2015 | Mnih et al. |
| 2016/0161267 | A1 | 6/2016 | Harada |
| 2016/0318515 | A1 | 11/2016 | Laur et al. |
| 2017/0113686 | A1 | 4/2017 | Horita et al. |
| 2017/0135621 | A1 | 5/2017 | Lee et al. |
| 2017/0345181 | A1 | 11/2017 | Yu et al. |
| 2018/0188733 | A1 | 7/2018 | Iandola et al. |
| 2018/0196439 | A1 | 7/2018 | Levinson et al. |
| 2018/0208166 | A1 | 7/2018 | Eckert |
| 2018/0232585 | A1 | 8/2018 | Kim |
| 2018/0339709 | A1 | 11/2018 | Tiwari et al. |
| 2019/0033085 | A1 | 1/2019 | Ogale et al. |
| 2019/0035275 | A1 | 1/2019 | Nishi |
| 2019/0084571 | A1 | 3/2019 | Zhu et al. |
| 2019/0145784 | A1 | 5/2019 | Ma et al. |
| 2019/0146492 | A1 | 5/2019 | Phillips et al. |
| 2019/0146508 | A1 | 5/2019 | Dean et al. |
| 2019/0147255 | A1 | 5/2019 | Homayounfar et al. |
| 2019/0168724 | A1 | 6/2019 | Vandenberg et al. |
| 2019/0176843 | A1 | 6/2019 | Jones et al. |
| 2019/0241198 | A1 | 8/2019 | Mori et al. |
| 2019/0291720 | A1 | 9/2019 | Xiao et al. |
| 2019/0311298 | A1 | 10/2019 | Kopp et al. |
| 2019/0315351 | A1 | 10/2019 | Smith et al. |
| 2019/0317496 | A1 | 10/2019 | Korchev et al. |
| 2019/0329763 | A1 | 10/2019 | Sierra Gonzalez et al. |
| 2019/0337502 | A1 | 11/2019 | Farres et al. |
| 2019/0337503 | A1 | 11/2019 | Otremba |
| 2019/0354101 | A1 | 11/2019 | Sujan et al. |
| 2019/0361454 | A1 | 11/2019 | Zeng et al. |
| 2019/0378019 | A1 | 12/2019 | Scheutz et al. |
| 2020/0004259 | A1 | 1/2020 | Gulino et al. |
| 2020/0010061 | A1 | 1/2020 | Tiwari et al. |
| 2020/0017080 | A1 | 1/2020 | Salvatora et al. |
| 2020/0026276 | A1 | 1/2020 | Zhang et al. |
| 2020/0033855 | A1 | 1/2020 | Jammalamadaka et al. |
| 2020/0033868 | A1 | 1/2020 | Palanisamy et al. |
| 2020/0055515 | A1 | 2/2020 | Herman et al. |
| 2020/0086862 | A1 | 3/2020 | Cui et al. |
| 2020/0086863 | A1 | 3/2020 | Rosman et al. |
| 2020/0133281 | A1 | 4/2020 | Gomez Gutierrez et al. |
| 2020/0139975 | A1 | 5/2020 | Ishikawa et al. |
| 2020/0143670 | A1 | 5/2020 | Kitani et al. |
| 2020/0150672 | A1 | 5/2020 | Naghshvar et al. |
| 2020/0174472 | A1 | 6/2020 | Zhang et al. |
| 2020/0207339 | A1 | 7/2020 | Neil et al. |
| 2020/0302322 | A1 | 9/2020 | Tukiainen et al. |
| 2020/0326667 | A1 | 10/2020 | Ahuja et al. |
| 2020/0346683 | A1 | 11/2020 | Okutani et al. |
| 2020/0356828 | A1 | 11/2020 | Palanisamy et al. |
| 2020/0363800 | A1 | 11/2020 | Jojo-Verge et al. |
| 2020/0385015 | A1 | 12/2020 | Tsuda |
| 2021/0107498 | A1 | 4/2021 | Liu et al. |
| 2021/0110484 | A1 | 4/2021 | Shalev-Shwartz et al. |
| 2021/0117760 | A1 | 4/2021 | Krishnan et al. |
| 2021/0179146 | A1 | 6/2021 | Nishida et al. |
| 2021/0201112 | A1 | 7/2021 | Gauthier et al. |
| 2021/0255620 | A1 | 8/2021 | Bielby et al. |
| 2021/0300405 | A1 | 9/2021 | Hyde et al. |
| 2021/0304123 | A1 | 9/2021 | Vanapalli et al. |
| 2021/0323523 | A1 | 10/2021 | Adler et al. |
| 2021/0374502 | A1 | 12/2021 | Roth et al. |
| 2021/0380132 | A1 | 12/2021 | Narang et al. |
| 2021/0390353 | A1 | 12/2021 | Futatsugi et al. |
| 2022/0001858 | A1 | 1/2022 | Futatsugi et al. |
| 2022/0340115 | A1 | 10/2022 | Knosmann et al. |
| 2023/0177241 | A1 | 6/2023 | Hasenklever et al. |
| 2023/0192126 | A1 | 6/2023 | Kumavat et al. |
| 2023/0192139 | A1 | 6/2023 | Kumavat et al. |
| 2023/0415721 | A1 | 12/2023 | Otremba et al. |
| 2024/0043064 | A1 | 2/2024 | Angenete |
| 2024/0157920 | A1 | 5/2024 | Schwagmeyer et al. |
| 2024/0190410 | A1 | 6/2024 | Komandur et al. |
| 2024/0246520 | A1 | 7/2024 | Van Thiel |
| 2024/0317200 | A1 | 9/2024 | Van Thiel |
| 2024/0359727 | A1 | 10/2024 | Schoon et al. |
| 2025/0050855 | A1 | 2/2025 | Hinricher et al. |
| 2025/0083648 | A1 | 3/2025 | Van Thiel |

FOREIGN PATENT DOCUMENTS

| | | |
|---|---|---|
| JP | 2018205940 A | 12/2018 |
| JP | 2019055768 A | 4/2019 |
| JP | 2019131141 A | 8/2019 |
| WO | 2011000714 A1 | 1/2011 |
| WO | 2017159176 A1 | 9/2017 |
| WO | 2018198823 A1 | 11/2018 |
| WO | 2019122952 A1 | 6/2019 |
| WO | 2019142276 A1 | 7/2019 |
| WO | 2020090251 A1 | 5/2020 |
| WO | 2020100408 A1 | 5/2020 |

OTHER PUBLICATIONS

"ApolloAuto/apollo Planning", GitHub, https://github.com/ApolloAuto/apollo/blob/master/modules/planning/README.md.

"Learning to Drive in a Day", https://www.youtube.com/watch?v=eRwTbRtnT1I, Jul. 2, 2018.

"Learning to Drive in a Day", Wayve, in research, Jun. 28, 2018, https://wayve.ai/blog/learning-to-drive-in-a-day-with-reinforcement-learning/.

Cui, J. , "A review on safety failures, security attacks, and available countermeasures for autonomous vehicles", Nov. 13, 2018; https://

(56) References Cited

OTHER PUBLICATIONS pureportal.coventry.ac.uk/en/publications/a-review-on-safety-failures-security-attacks-and-available-counte.

Dabboussi, Abdallah , "Dependability approaches for mobile environment: Application on connected autonomous vehicles", Diss. University Bourgogne Franche-comté, 2019, submitted Mar. 12, 2020.

Grimmet, Hugo , et al., "Integrating Metric and Semantic Maps for Vision-Only Automated Parking", 2015 IEEE International Conference on Robotics and Automation (ICRA), Washington State Convention Center, Seattle, Washington, May 26-30, 2015.

Guibas, Leonidas J., et al., "Bounded Uncertainty Roadmaps for Path Planning", IN Proc. Int. Workshop on the Algorithmic Foundations of Robotics, 2008.

Karmakar, Gour , et al., "Assessing Trust Level of a Driverless Car Using Deep Learning", IEEE Transactions of Intelligent Transportation Systems, vol. 22, No. 7, Jul. 2021.

Kendall, Alex , et al., "Learning to Drive in a Day", arXiv:1807.00412v2, Sep. 11, 2011.

Kuwata, Yoshiaki , et al., "Real-Time Motion Planning With Applications to Autonomous Urban Driving", IEEE Transactions on Control Systems Technology, vol. 17, No. 5, Sep. 1, 2009.

Liu, Liangkai , et al., "Computing Systems for Autonomous Driving: State-of-the-Art and Challenges", Dec. 7, 2020 ; https://arxiv.org/abs/2009.14349.

Loquercio, Antonio , et al., "A General Framework for Uncertainty Estimation in Deep Learning", IEEE Robotics and Automation Letters PP(99):1-1, Feb. 2020.

Rastgoftar, Hossein , et al., "A Data-Driven Approach for Autonomous Motion Planning and Control in Off-Road Driving Scenarios", 2018 American Control Conference (ACC), IEEE, 2018, May 2018.

Schwarting, Wilko , et al., "Planning and Decision-Making for Autonomous Vehicles", Annual Review of Control, Robotics, and Autonomous Systems, Jan. 12, 2018, pp. 187-210.

Wu, Chien-Hsun , "Mechatronics and Remote Driving Control of the Drive-by-Wire for a Go Kart", Feb. 23, 2020; https://www.mdpi.com/1424-8220/20/4/1216.

100

200
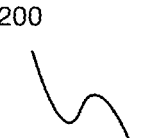
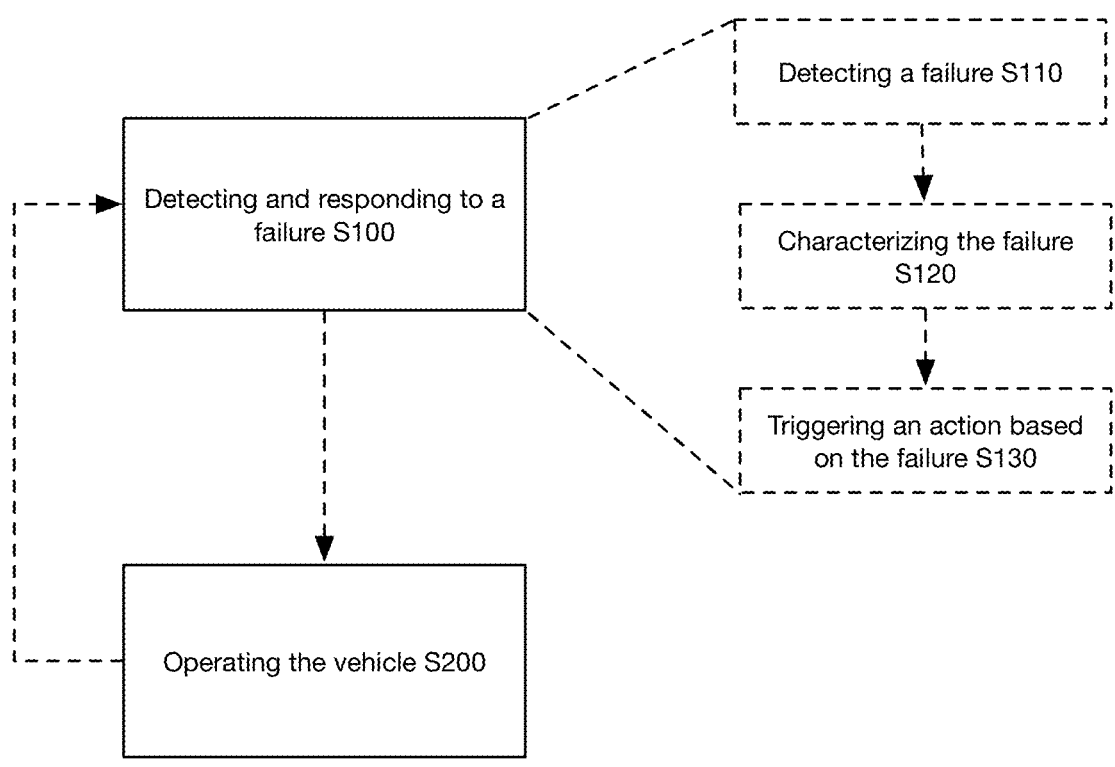
FIGURE 2

Drive-by-wire subsystem 110

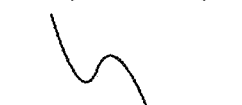

Drive-by-wire subsystem 110

SBW subsystem
Electric SBW actuator(s) | Hydraulic SBW actuator(s)

1st SBW sensor

2nd SBW sensor

BBW subsystem
Engine brake actuator(s) | Valve actuator(s)

1st BBW sensor

2nd BBW sensor

ShBW subsystem
Electric ShBW actuator(s) | Manual override actuator(s)

1st ShBW sensor

2nd ShBW sensor

TBW subsystem
Electric actuator(s)

1st TBW sensor

2nd TBW sensor

FIGURE 3

System including multiple
sets of computing
subsystems
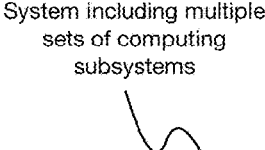
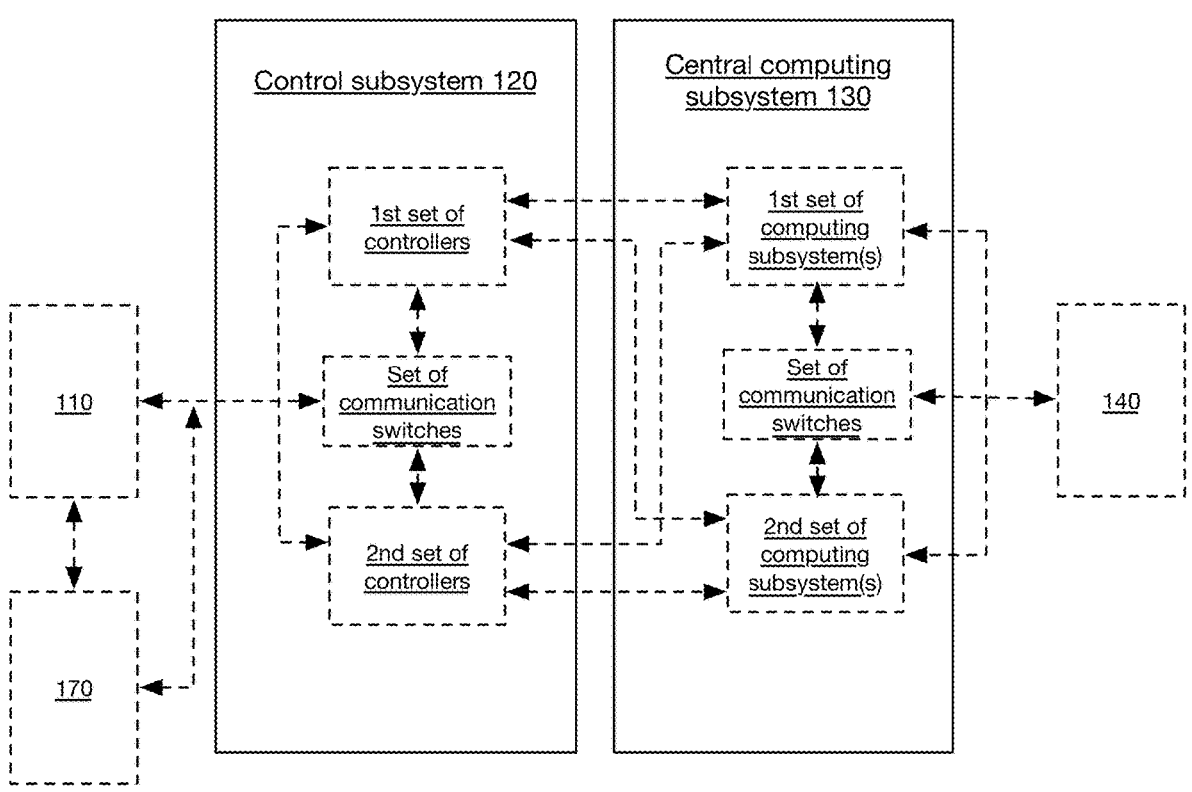
FIGURE 5

METHOD AND SYSTEM FOR ADDRESSING FAILURE IN AN AUTONOMOUS AGENT

CROSS-REFERENCE TO RELATED APPLICATIONS

This application is a continuation of U.S. application Ser. No. 18/082,173, filed 15 Dec. 2022, which claims the benefit of U.S. Provisional Application No. 63/290,407, filed 16 Dec. 2021, each of which is incorporated in its entirety by this reference.

TECHNICAL FIELD

This invention relates generally to the autonomous vehicle field, and more specifically to a new and useful system and method for addressing failure in an autonomous agent in the autonomous vehicle field.

BRIEF DESCRIPTION OF THE FIGURES

FIG. 2 is a schematic of a method for addressing failure in an autonomous agent.

FIG. 3 is a schematic variation of a drive-by-wire subsystem.

FIG. 5 is a second schematic variation of a control subsystem.

DETAILED DESCRIPTION

The following description of the embodiments of the invention is not intended to limit the invention to these embodiments, but rather to enable any person skilled in the art to make and use this invention.

1. Overview

Figure 1:
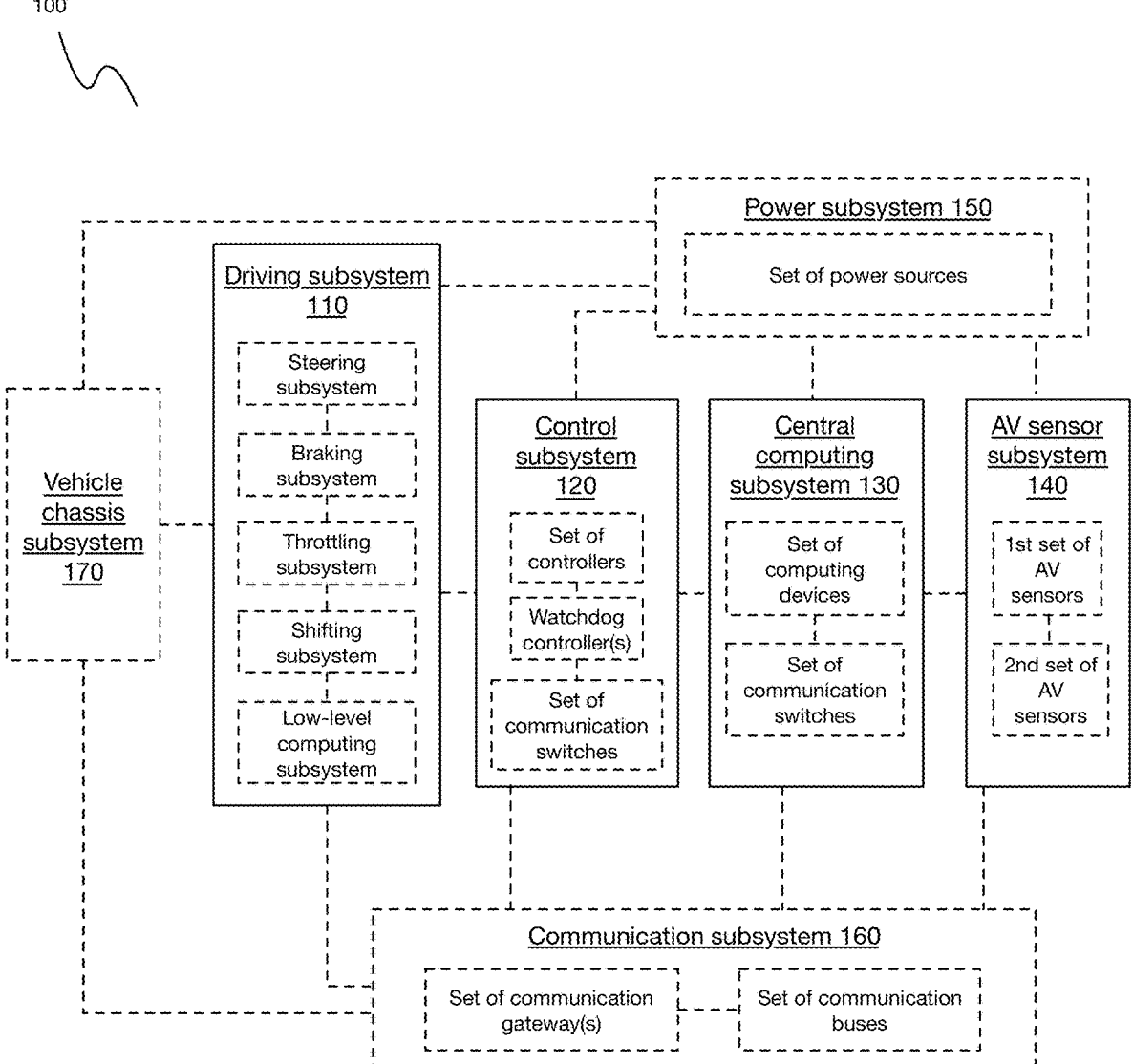
FIG. 1 is a schematic of a system for addressing failure in an autonomous agent.

As shown in FIG. 1, a system 100 for addressing failure in an autonomous agent includes a Driving subsystem 110, a Control subsystem 120, a Central computing subsystem 130, and an Autonomous Vehicle (AV) sensor subsystem 140. The system 100 can optionally include a Power subsystem 150, a Communication subsystem 160, a Vehicle chassis subsystem 170, a distributed processing and/or computing subsystem, a supplementary sensor subsystem, and/or any other components. Additionally or alternatively, the system 100 can include and/or interface with any or all of the components as described in U.S. application Ser. No. 17/116,810, filed 9 Dec. 2021, U.S. application Ser. No. 17/125,668, filed 17 Dec. 2020, U.S. application Ser. No. 17/127,599, filed 18 Dec. 2020, U.S. application Ser. No. 17/962,459, filed 7 Oct. 2022, and U.S. application Ser. No. 18/075,778, filed 6 Dec. 2022, each of which is incorporated herein in its entirety by this reference.

As shown in FIG. 2, a method 200 for addressing failure can include any or all of: detecting and responding to a failure S100; and operating the vehicle S200. Additionally or alternatively, the method 200 can include any other processes. Further additionally or alternatively, the method

200 can include and/or interface with any or all of the methods, processes, embodiments, and/or examples as described in any or all of: U.S. application Ser. No. 17/116, 810, filed 9 Dec. 2021, U.S. application Ser. No. 17/125,668, filed 17 Dec. 2020, U.S. application Ser. No. 17/127,599, filed 18 Dec. 2020, U.S. application Ser. No. 17/962,459, filed 7 Oct. 2022, and U.S. application Ser. No. 18/075,778, filed 6 Dec. 2022, each of which is incorporated herein in its entirety by this reference. The method 200 can be performed with a system as described above and/or any other suitable system.

2. Benefits

The system and method for addressing failure in an autonomous agent can confer several benefits over current systems and methods.

In a first variation, the technology confers the benefit of enabling an autonomous vehicle to be fail-operational in a way which is safe and optimally targeted to the particular failure, through a multi-layered redundant architecture for hardware and software subsystems of the vehicle.

Additionally, distributed and/or sharded computing (e.g., of various compute, of various capabilities and/or functionalities, etc.) within and/or throughout subsystems of the system can further contribute to conferring this benefit and/or any other benefits. In examples, for instance, any or all subsystems of the system have associated (e.g., designated) computing abilities (e.g., low-level computing with one or more processors, embedded controllers/computers, etc.), thereby enabling individual subsystems and/or individual components within subsystems to detect (e.g., autonomously detect, independently detect, etc.) and assess failures, as well as implement subsystem-specific failure responses (e.g., absent of confirmation from high-level computers, upon confirmation from high-level computers, etc.). This can enable failures of different severities and/or failures originating from different causes and sources to be optimally handled by the relevant subsystems, thereby saving time, computational resources, and also enabling the most relevant failure responses to be initiated. In specific examples, for instance, the sharding (e.g., distributing, partitioning, etc.) of data functions to split data across the overall compute network into data shards that enables processing of the data to be easily scalable with low latency.

In a second variation, additional or alternative to the first, the technology confers the benefit of robustly, reliably, and safely operating a vehicle autonomously without relying on a human operator onboard the vehicle (and/or a teleoperator remote from the vehicle), as enabled through an architecture which implements various redundancies in both hardware and software (where these multiple types and sources redundancies are equivalently referred to herein as multi-layered architectures). In specific examples, in the event of a failure (e.g., of a hardware component, of a software system, etc.), the severity of the failure can be assessed and handled by introducing subsystems or modules that are able to perform nominal or degraded functions in light of the failure.

Additionally or alternatively, the technology can confer the benefits of enabling (e.g., in response to new information, changed circumstances, etc.) any or all of: dynamically escalating fail-operational behavior into fail-safe behavior (e.g., after a fail-operational action has been triggered, while a fail-operational action is being executed, etc.); dynamically de-escalating fail-safe behavior into fail-operational behavior (e.g., after a fail-safe action has been triggered, while a fail-safe action is being executed, etc.); and/or otherwise dynamically adjusting the vehicle's response/behavior.

Additionally, robustness, reliability, and the quick implementation of targeted failure responses can be enabled through a fixed-route and/or otherwise limited operational design domain (ODD) associated with use cases of the vehicle. In specific examples, for instance, a fixed-route use case of the vehicles enables failures to be detected precisely and with a high level of accuracy and specificity, which thereby enables very targeted, failure-specific responses to be reliably selected and initiated. In specific examples, for instance, the failure responses are programmed (e.g., hard-coded, explicitly programmed, etc.)

In a third variation, additional or alternative to those described above, the technology confers the benefit of intelligently arbitrating between various subsystems and various redundant components within each subsystem, such that the various inputs do not conflict. In specific examples, assessing and responding to a failure happens over multiple subsystems such that appropriate/optimal logic can be used to implement a variety of fallback and/or fail-safe responses depending on the particular failure. This can in turn function to not require overly conservative fallback and/or fail-safe behavior in all cases, but rather enable behavior to be selected which is most appropriate and optimal for the particular failure scenario.

In a fourth variation, additional or alternative to those described above, the technology confers the benefit of working within space constraints associated with particular types of vehicles. In specific examples, the system is able to be integrated within vehicles of a size between passenger vehicles and semi-trucks, such as Class 3-7 commercial trucks, which may not have the space available to simply duplicate all hardware components to execute sufficient redundancy. Additionally or alternatively, the system and/or method confers the benefit of implementing a tradeoff between handling redundancies solely through software and handling redundancies solely through hardware.

Additionally or alternatively, the system and method can confer any other benefit.

3. System 100

As shown in FIG. 1, a system 100 for addressing failure in an autonomous agent includes a driving subsystem 110 (equivalently referred to herein as an actuation subsystem), a control subsystem 120, a computing subsystem 130, and an autonomous vehicle (AV) sensor subsystem 140. The system 100 can optionally additionally include a power subsystem 150, a communication subsystem 160, a vehicle chassis subsystem 170, a distributed computing and/or processing subsystem, a supplementary sensor subsystem, and/or any other components. Additionally or alternatively, the system 100 can include and/or interface with any or all of the components as described in U.S. application Ser. No. 17/116,810, filed 9 Dec. 2021, U.S. application Ser. No. 17/125,668, filed 17 Dec. 2020, U.S. application Ser. No. 17/127,599, filed 18 Dec. 2020, U.S. application Ser. No. 17/962,459, filed 7 Oct. 2022, and U.S. application Ser. No. 18/075,778, filed 6 Dec. 2022, each of which is incorporated herein in its entirety by this reference.

The system 100 functions to achieve numerous types and locations of redundancy (e.g., hardware redundancy, software redundancy, etc.)—equivalently referred to herein as a multi-layered redundancy—as well as numerous types and layers of failure management to facilitate reliable, robust, and/or safe operation of an autonomous agent. Examples of types of failures (equivalently referred to herein as faults, errors, susceptibilities to failure, etc.) that can be handled by this redundancy can include, but are not limited to, any or all of: hardware failures (e.g., electrical failure, sensor failure, actuator failure, controller failure, etc.); software and/or logic and/or algorithmic failures (e.g., logic determination/execution failure, algorithm determination/execution failure, function execution failure, code execution failure, etc.); hardware and software failures; and/or any other failures. The failures can additionally or alternatively refer to the vehicle's susceptibility to failure, such as when encountering unknowns in its environment. In specific examples, for instance, the vehicle's susceptibility to failure is determined in accordance with an uncertainty estimation process and/or out-of-distribution detection (e.g., relative to data collected at the sensor subsystem), such as, but not limited to, any or all of those described in U.S. application Ser. No. 17/127,599, filed 18 Dec. 2020, which is incorporated herein in its entirety by this reference.

The system preferably includes at least redundancy which is managed at least (at a minimum) by a shared and distributed architecture of system elements, but can additionally or alternatively include redundancy within the methods of operation of system components, and/or any other redundancies. In preferred variations, for instance, the multi-layered redundancy is implemented within and across subsystems of the system, such as within, but not limited to, any or all of: redundant actuators of the driving subsystem (e.g., drive-by-wire [DBW] subsystem), redundant sensors in the driving subsystem, overlapping field-of-view (FOV) sensors in the autonomous vehicle (AV) sensor subsystem, independent and multimodal AV sensing, redundant and/or independent computing devices, redundant and/or independent communication networks, multiple power sources, and/or any other redundancies. These redundant components are preferably subsequently implemented with a method which determines and/or implements logic scenarios which function to ensure that any subsystem and/or component failure can be tolerated with minimal risk to the vehicle or others on the road. Additionally or alternatively, the multi-layered redundancy architecture can be implemented in any other suitable way(s).

In preferred variations, redundancy is achieved by introducing physical elements to the architecture such as duplicate power sources, duplicate actuators, duplicate sensors, any combination, and/or any other duplicate components. This, combined with various logic scenarios, ensures that any subsystem or component failure can be tolerated through the intelligent, selective implementation of hardware with associated logic depending on where the failure has occurred.

In specific examples, for instance, redundancy can be achieved through any or all of: redundancy in power (e.g., electrical power in the DBW subsystem); redundancy in actuation (e.g., mechanical, hydraulic, and electrical actuators of the DBW subsystem); redundancy in program execution (e.g., redundant controllers, redundant software, etc.); redundancy in communication (e.g., redundant communication buses, redundant ethernet sources/switches, etc.); redundancy in sensor fields of view (FOVs) and multimodal AV sensing (e.g., redundant Lidars, redundant cameras, redundant radars, etc.); redundancy in AV compute; redundancy in executing an MRC; redundant paths in comparison and/or voting for safety-critical software processes; diverse redundancy in software design; redundant storage of data; multiple communication network channels (e.g., include those to remote operators); multiple sensor modalities (e.g., LIDARs and cameras and Radars providing 360-degree coverage around the vehicle along with high-precision GPS); and/or any other redundancies.

The system 100 further preferably functions to enable the autonomous agent to operate in a fail-operational state such that the vehicle can operate (e.g., at a degraded ability depending on the type of failure) without reliance on a human operator (e.g., onboard human operator). Additionally or alternatively, the system 100 can operate in conjunction with a human operator (e.g., onboard human operator, remote teleoperator, etc.), in a fail-safe state (where the system enters a safe operating mode with reduced functionality), in a fail-soft state (where the system enters a degraded mode after a failure), and/or otherwise suitably operate.

In a preferred set of variations, for instance, the system and/or associated method are designed with fail-safe principles that are both proactively and reactively safe. For instance, the system is preferably configured with software and hardware that are self-correcting and self-healing in the presence of failure, enabling active, dynamic recovery mechanisms for the vehicle that proactively detect failure and trigger self-corrections (e.g., in code execution, logic, hardware resets, etc.) to accomplish optimal (e.g., graceful, with minimal disruption to other vehicles, etc.) failure behaviors.

Proactive safety preferably refers herein to the system being self-aware of (e.g., able to self-diagnose) its failures and prepared (e.g., at all times, in a low latency manner, without requiring the involvement of higher-level systems, etc.) to handle such failures gracefully, safely, and efficiently. A custom-tiered diagnostics system can be used, for instance, with built-in self-testing and built-in capabilities (e.g., through low-level distributed computing within subsystems, through high-level computing abilities in communication with the low-level computing of the subsystems, etc.) that proactively detect hardware, software, and/or vehicle platform issues (or the potential for issues). This ensures fail-safe redundancies at the system—and/or subsystem—and/or component-levels, as well as strengthens the validity of the vehicle's overall safety system. Further, a record can be maintained (e.g., dynamically maintained) and all errors (e.g., critical errors, moderate errors, low-severity errors, etc.) are reported from validation testing, operation, and/or field deployments of the vehicle in order to continually improve the system's failure responses, even in cases in which there are no active human interventions (e.g., from backup safety drivers, from remote operators, etc.).

Reactive safety preferably refers herein to the system's (and/or method's) ability to respond to factors extraneous to itself that could lead to critical failure (e.g., characterizing the vehicle's susceptibility to failure), such as potential collisions of the vehicle with other road users (e.g., due to uncertainty associated with the perception sensors, based on behavior of the other road users, etc.). Based on the potential severity of such potential failures, an appropriate minimal risk condition (MRC) or other failure response (e.g., new trajectory) can be selected that minimizes the vehicle's potential for harm (e.g., risk of collision).

The proactive and reactive failures can optionally, in the system and/or method, be systematically characterized with respect to a common, shared failure architecture such that failures occurring in any part of the system, subsystem, and/or individual components can be accounted for with an appropriate failure response (e.g., selection and performance of an MRC). Alternatively, these different types of failures can be characterized differently and/or otherwise suitably detected and responded to.

The system further preferably functions as and/or defines a failure management architecture which is distributed among any or all subsystems of the system (e.g., as described in the implementation of the method 200 below), such that failures can be detected and/or responded to by any or all subsystems of the system (e.g., through distributed computing among subsystems, through voting and arbitration within and/or among subsystems, etc.).

The system preferably interfaces with (e.g., is integrated within) an autonomous vehicle (equivalently referred to herein as an autonomous agent and/or ego agent), but can additionally or alternatively interface with any other suitable robotic systems or other subsystems. In a preferred set of variations, the autonomous vehicle is a truck, further preferably a commercial truck between Classes 3-7, but can additionally or alternatively include any other vehicle(s). In specific examples, the autonomous vehicle is a Class 3-7 truck which is used for deliveries of goods (e.g., business-to-business [B2B] deliveries, deliveries between retail centers and/or distribution centers and/or warehouses, etc.). Additionally or alternatively, the autonomous vehicle can be used for any suitable functions (e.g., transporting passengers, ride sharing, etc.).

The autonomous vehicle is preferably used in conjunction with a fixed-route use case, but can additionally or alternatively be used in non-fixed-route use cases.

In a preferred set of variations, for instance, the autonomous vehicle is configured for use in association with short-haul logistics applications, such as those which use autonomous vehicles to deliver goods between destinations. The autonomous vehicles preferably perform these deliveries according to a set of fixed routes, but can additionally or alternatively follow dynamic routes and/or be otherwise operated. In specific examples, for instance, the autonomous vehicles can be used in accordance with any or all of the use cases as described in any or all of: U.S. application Ser. No. 17/116,810, filed 9 Dec. 2021, U.S. application Ser. No. 17/125,668, filed 17 Dec. 2020, U.S. application Ser. No. 17/127,599, filed 18 Dec. 2020, U.S. application Ser. No. 17/962,459, filed 7 Oct. 2022, and U.S. application Ser. No. 18/075,778, filed 6 Dec. 2022, each of which is incorporated herein in its entirety by this reference.

In examples, for instance, the domain where the autonomous vehicles operate is intentionally limited, thereby enabling the validation and training associated with the system and method to be reduced (e.g., exponentially relative to conventional autonomous vehicles) due to this constrained domain. The probability of unknowns or "edge cases" that lead to failures can also be substantially reduced relative to other conventional systems and methods and/or the confidence with which such unknowns and/or edge cases can be identified can be substantially increased. Repeatedly driving on fixed routes, for instance, can allow the technology to be heavily optimized to these routes, thereby enabling deployed autonomous vehicles to have gone through several verification and validation stages that successfully optimize the detection and response to specific failures.

Additionally or alternatively, the system can otherwise function and/or be otherwise suitably configured.

3.1 System—Driving Subsystem 110

The system 100 includes and/or interfaces with a driving subsystem 110, which functions to control the motion of the vehicle during normal operation and further preferably during fail-operational and/or fail-safe states (e.g., as described below). For instance, nominally, in the absence of failures, the autonomous agent controls the motion of the vehicle through the driving subsystem 110. However, in the presence of certain failures, redundancy can be achieved by bypassing the driving subsystem for specific ungraded motion control actions that have significantly less computational overhead. Additionally or alternatively, any or all of the vehicle's motions/movements can be controlled in absence of a driving subsystem, with any other subsystem, and/or with any combination of subsystems.

The driving subsystem further preferably functions to detect (e.g., self-detect with low-level computing components as described below) and self-correct (e.g., self-heal, self-reset, etc.) at least a subset of failure types, such as, but not limited to, those associated with components of the driving subsystem (e.g., vehicle's braking components, vehicle's throttle components, vehicle's steering components, vehicle's shifting components, etc.). Additionally or alternatively, the driving subsystem can function to detect any other failure types and/or events.

The driving subsystem yet further preferably functions to initiate (e.g., trigger, implement, etc.) failure responses and/or any other actions (e.g., associated with components of the driving subsystem) in response to a detected failure (e.g., which is hard-coded to be handled by the driving subsystem), such as a failure detected by the driving subsystem and/or a failure detected by one or more other subsystems and involving components of the driving subsystem.

Additionally or alternatively, the driving subsystem can perform any other suitable functions.

The driving subsystem is preferably in the form of a drive-by-wire (DBW) infrastructure, implementing drive-by-wire components. Alternative variations can additionally or alternatively include a cable-by-wire infrastructure and/or any other types or combinations of types of driving subsystems.

The driving subsystem can optionally be operable in a set of operation modes, such as: an autonomous operation mode in which the driving subsystem executes vehicle motion when it receives commands from the high-level computing subsystem (e.g., as described below); a manual operation mode (e.g., human-operated mode, teleoperated mode, etc.) in which the driving subsystem acts as a gateway to relay driver inputs to the actuators; and/or any other operation modes. Alternatively, the drive-by-wire subsystem can be operable in only a subset of these modes, and/or in any other modes.

The driving subsystem preferably includes a set of actuators as integrated in the subsystems described below, along with associated low-level computing components and/or diagnostic sensors (e.g., to detect actuator health, to detect actuator outputs, to sense actuator inputs, etc.) (e.g., as described below), but can additionally or alternatively include any other components.

The driving subsystem preferably includes a steering subsystem (e.g., as shown in FIG. 3), which functions to steer (turn) the vehicle during autonomous and/or manual operating modes. Additionally or alternatively, the actuation subsystem can be absent of a steer-by-wire subsystem.

The steering subsystem is preferably a steer-by-wire (SBW) subsystem, but can additionally or alternatively include a steer-by-cable subsystem and/or any other subsystems.

The steering subsystem (equivalently referred to herein as a steer subsystem) preferably includes a set of actuators, further preferably a redundant set of actuators (e.g., of the same type, of different types, hydraulic and electric, etc.), such as a set of motors (e.g., electronic power assisted steering [EPAS] motors) which function to rotate one or more steering components (e.g., steering column) of the vehicle, but can additionally or alternatively include any other actuators and/or types of actuators.

The steering actuators preferably include and/or interface with processing and/or computing abilities (e.g., through low-level processors/computers such as embedded controllers/computers, as described below, etc.), thereby enabling the actuators to detect and/or respond to failures, such as through built-in voting and arbitration functions, which support a fail-operational architecture and can function to eliminate and/or minimize the risks of failures (e.g., any single point failures) which might disable and/or otherwise affect the system. The steering subsystem further preferably includes and/or interfaces with the communication subsystem, further preferably a redundant communication subsystem (e.g., redundant communication network, redundant Controller Area Network [CAN] network, etc.) which functions to enable commands to be communicated to the steering actuators (e.g., and receive feedback from the steering actuators, and communicate with each other, etc.) as well as enable steering information to be communicated to any or all other subsystems and/or components of the system. The steering subsystem further preferably interfaces with redundant power sources, which function to ensure that continuous power is provided to the steering subsystem (e.g., even in an event that one of the communication buses [e.g., CAN buses] fails). The steering subsystem can optionally implement a mechanical backup mode, which enables the vehicle to be steered by a safety operator, in the event of multiple point failures. Additionally or alternatively, the steering subsystem can be implemented in absence of a mechanical backup mode, and/or can be operable in any other modes and/or can include any other components.

The driving subsystem further preferably includes a braking subsystem (equivalently referred to herein as a brake subsystem), which functions to apply braking force at the road wheels to stop the vehicle in autonomous and/or manual operating modes. Additionally or alternatively, the driving subsystem can be absent of a braking subsystem and/or be otherwise configured.

The braking subsystem is preferably a brake-by-wire (BBW) subsystem, but can additionally or alternatively include a brake-by-cable subsystem and/or any other subsystems.

The braking subsystem preferably includes a set of braking actuators (e.g., electro-pneumatic actuators, hydraulic actuators, engine actuators, brake actuators, EPB actuators, etc.), further preferably a redundant set of braking actuators (e.g., of the same type, of different types, etc.) that communicate over a redundant communication subsystem (e.g., redundant communication networks as described above). The braking actuators preferably include and/or interface with processing and/or computing abilities (e.g., through low-level processors/computers such as embedded controllers/computers, as described below, etc.), thereby enabling the actuators to detect and/or respond to failures, such as through built-in voting and arbitration functions, which support a fail-operational architecture and can function to eliminate and/or minimize the risks of failures (e.g., any single point failures) which might disable and/or otherwise affect the system. In some variations, the brake 'lines' that hold either hydraulic and/or pneumatic pressure are designed with isolation valves that not only insulate the lines from each other, but also distribute pressure to the road wheels such that failures in a single brake line do not lead to complete loss of braking. The braking valves are preferably designed to fail-open, where upon detecting a pressure loss (and/or any other relevant failure), the valves open instantaneously, applying high braking force to bring the vehicle to an immediate stop. Additionally or alternatively, the brakes can be otherwise configured. The braking subsystem further preferably interfaces with redundant power sources, which function to ensure that continuous power is provided to the steering subsystem (e.g., even in an event that one of the communication buses fails). The braking subsystem can optionally transition to braking through an electronic parking brake (EPB) (equivalently referred to herein as an electric park brake) in the event of multiple point failures. The braking subsystem can optionally and/or additionally utilize engine braking through selection of appropriate transmission gears. In case of failure a combination of engine braking and the electronic parking brake (EPB) can provide a redundant braking actuation. Additionally or alternatively, the braking subsystem can include any other components and/or otherwise operate.

The driving subsystem further preferably includes a throttling subsystem, which functions to control the longitudinal motion of the vehicle in autonomous and/or manual operating modes. Additionally or alternatively, the throttling subsystem can control other motions of the vehicle and/or be otherwise suitably configured.

The throttling subsystem is preferably a throttle-by-wire (TBW) subsystem, but can additionally or alternatively include a throttle-by-cable subsystem and/or any other subsystems.

The throttling subsystem (equivalently referred to herein as a throttle subsystem) preferably includes a set of actuators (e.g., electric actuators) which control the longitudinal motion of the vehicle by sending appropriate (e.g., optimal) acceleration torque requests. The throttle subsystem preferably interfaces with a redundant set of sensors (e.g., as described below) and an Engine Control Module (ECM) associated with high performance (e.g., high reliability), but can additionally or alternatively interface with any other components (e.g., redundant communication buses, redundant power sources, etc.).

The throttling subsystem preferably communicates over a redundant communication subsystem (e.g., redundant communication networks as described above). The throttle actuators preferably include and/or interface with processing and/or computing abilities (e.g., through low-level processors/computers such as embedded controllers/computers, as described below, etc.), thereby enabling the actuators to detect and/or respond to failures, such as through built-in voting and arbitration functions, which support a fail-operational architecture and can function to eliminate and/or minimize the risks of failures (e.g., any single point failures) which might disable and/or otherwise affect the system. The throttling subsystem further preferably interfaces with redundant power sources, which function to ensure that continuous power is provided to the throttle actuators (e.g., even in an event that one of the communication buses fails). Additionally or alternatively, the throttling subsystem can be otherwise suitably configured.

The driving subsystem further preferably includes a shifting subsystem (equivalently referred to herein as a shift subsystem), which functions to facilitate gear selection of the autonomous vehicle, such that the autonomous vehicle can be parked, driven forward, driven in reverse, driven in low-gear, and/or otherwise driven. Additionally or alternatively, the driving subsystem can be absent of a shifting subsystem and/or be otherwise suitably configured.

The shifting subsystem is preferably a shift-by-wire (ShBW) subsystem, but can additionally or alternatively include a shift-by-cable subsystem and/or any other subsystems.

The shifting subsystem preferably includes redundant transmission controllers (equivalently referred to herein as shift controllers) coupled with redundant transmission actuators, which shift the gears on the transmission in autonomous and/or manual operating modes.

The shift controllers preferably include and/or interface with processing and/or computing abilities (e.g., through low-level processors/computers such as embedded controllers/computers, as described below, etc.), thereby enabling the shifting subsystem to detect and respond to failures, such as through built-in voting and arbitration functions, which support a fail-operational architecture and can function to eliminate and/or minimize the risks of failures (e.g., any single point failures) which might disable and/or otherwise affect the system.

The shifting subsystem further preferably interfaces with redundant power sources, which function to ensure that continuous power is provided to the shifting subsystem (e.g., even in an event that one of the communication buses fails). Optionally, the transmission shifter can be manually overridden in case of multiple point failures. Additionally or alternatively, the shifting subsystem can include any other components and/or otherwise operate.

Any or all of the steering, braking, throttling, and shifting subsystems are preferably in communication with each other (e.g., via the communication subsystem, via direct electrical and/or mechanical communications, etc.). Alternatively, the subsystems can be absent of communication with each other. The driving subsystem is further preferably configured for communication with any other subsystems (e.g., via the communication network), such that failures can be communicated and/or collectively detected and/or responded to by multiple subsystems and/or multiple components (e.g., as described below). In preferred variations, the communication subsystem itself addresses redundancy by ensuring multiple modes of communication (e.g., CAN, Ethernet, etc.) are available and switchable to provide redundancy in case of failure. These are preferably automotive grade communications (e.g., automotive ethernet) which include physically rugged components and offer high safety performance (e.g., stronger, more resistant to breakage, able to withstand higher temperatures and/or physical perturbations, etc.), but can additionally or alternatively include and/or interface with any other components.

The driving subsystem (and/or any other components of the system) further preferably includes and/or interfaces with a supplementary sensor subsystem, where the supplementary sensor subsystem includes a set of sensors (e.g., diagnostic sensors, health sensors, health monitoring sensors, etc.), further preferably a redundant set of sensors (e.g., different types of sensors, same types of sensors, etc.), which function to monitor (e.g., to detect failures, to detect a particular type of failure, etc.) components of any or all of: the steering subsystem, the braking subsystem, the throttling subsystem, the shifting subsystem, and/or any other components of the driving subsystem. The sensor subsystem further preferably functions to provide feedback from the set of actuators to other components of the system. In preferred variations, for instance, sensor values are sent to the control subsystem (e.g., to one or more controllers of the control subsystem as described below), such that their values can be evaluated (e.g., compared with each other, compared with an expected value, etc.) and/or used. These values can additionally or alternatively be used (e.g., by a controller, by low-level computing components, by the high-level computing subsystem, etc.) to determine if a failure has occurred and optionally which component (e.g., which actuator) is the source of the failure. The driving subsystem inputs/outputs (I/O's) and measured estimates (e.g., steering angle, brake or throttle percentage, etc.) are further preferably evaluated for plausibility, rationality, latency/communication diagnostics, cross sensor checks, output monitoring, kinematically feasible I/O's, signal validity, command vs. response diagnostics, and/or any other factors. This due diligence at the low-level controls can ensure that only rarest of rare occurrences of failure can arise from the driving subsystem and that these rare failures are significantly easier to triage and identify their root cause. Additionally or alternatively, the sensor subsystem can perform any other functions.

The sensors associated with each actuator can be any or all of: identical, different, or any combination.

In a preferred set of variations, the driving subsystem sensors are redundant for each function (e.g., steering, braking, throttling, and shifting) and measure and report each actuator's position such as: steering angle position, throttle percent torque, applied brake pedal percentage, and current gear. This feedback can then optionally be transmitted through a communication subsystem (e.g., redundant communication network) to other subsystems, used by the driving subsystem to detect a failure, and/or otherwise used by any portion of the system to detect and respond to a failure. For instance, based on the information provided by these sensors, the driving subsystem, and hence the AV system, can know if the trajectory set by the planner is being maintained (and/or if a failure or potential failure has occurred).

Additionally or alternatively, the driving subsystem can include any other components.

3.2 System—Control Subsystem 120

The system 100 includes a control subsystem 120, which functions to perform decision-making on how to actuate the vehicle (e.g., determining and transmitting commands to the actuators). The control subsystem can additionally function to determine a health of any or all of the actuators in the driving subsystem, such that if there are any failures in the actuator, the control subsystem can trigger the utilization of a backup actuator (e.g., hydraulic SBW actuator triggered in the event that the electrical SBW actuator fails). Additionally or alternatively, the driving subsystem can trigger this utilization on its own. Further additionally or alternatively, the control subsystem can be used in combination with any other subsystems and/or used for any other suitable purposes.

In preferred variations, the control subsystem inputs/outputs (I/O's) and measured estimations (e.g., transmission control range) can be evaluated for any or all of: plausibility, rationality, latency/communication diagnostics, cross sensor checks, output monitoring, kinematically feasible I/O's, signal validity, command vs. response diagnostics, and/or any other features, where this due diligence can function to ensure that only the rarest of rare occurrences of failure can arise from the control subsystem and that these rare failures are significantly easier to triage and have their root causes identified.

Additionally or alternatively, the control subsystem can be otherwise configured.

The control subsystem 120 is preferably in communication with the computing subsystem 130 and optionally with any other subsystems, such as the driving subsystem 110, any other subsystems, and/or all subsystems (e.g., via the communication subsystem). The control subsystem 120 can additionally be distributed among any number of subsystems of the system, such as through controllers (e.g., low-level controllers, embedded controllers, etc.) associated with any or all of the actuators or other components of the subsystem(s) (e.g., actuators of the driving subsystem).

The control subsystem preferably includes a set of one or more controllers. The set of controllers preferably includes electronic control units (ECUs), but can additionally or alternatively include any other controllers (e.g., microcontrollers, two-position controllers, proportional controllers, integral controllers, derivative controllers, etc.), such as, but not limited to: engine control modules (ECMs), powertrain control modules (PCMs), transmission control modules (TCMs), brake control modules (BCMs), central control modules (CCMs), central timing modules (CTMs), general electronic modules (GEMs), body control modules, suspension control modules, and/or any other types of controllers.

The controllers can be the same kind/type, different kinds/types, associated with the same performance parameters, associated with different performance parameters, and/or can include any combination of controllers. Additionally or alternatively, the control subsystem can include any other components (e.g., diagnostic sensors configured to detect/determine controller health, etc.). The controllers are preferably physically integrated within the vehicle network, but can additionally or alternatively be otherwise arranged/configured.

Figure 4:
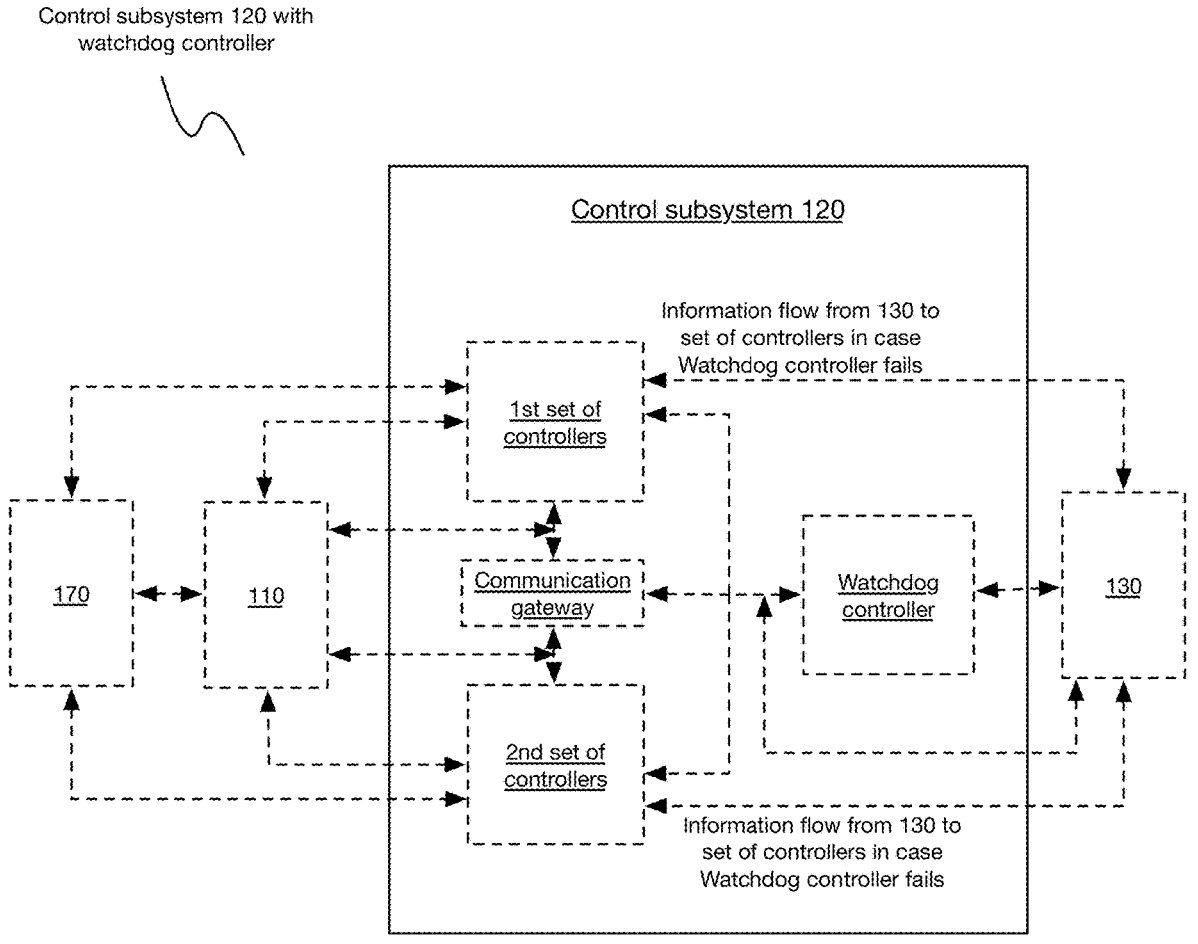
FIG. 4 is a first schematic variation of a control subsystem.

The control subsystem preferably includes multiple controllers, which can function to: provide redundancy (e.g., in case 1 controller fails), enable comparisons and/or checking of values received by and/or produced at different controllers, and/or perform any other functions. In a preferred set of variations (e.g., as shown in FIG. 4, as shown in FIG. 5, etc.), the control subsystem includes redundant controllers, the redundant controllers including a $1^{st}$ set of one or more controllers (e.g., $1^{st}$ ECU) and a $2^{nd}$ set of one or more controllers (e.g., $2^{nd}$ ECU). The $1^{st}$ and $2^{nd}$ controllers are preferably of the same type, but can alternatively be of different types. Additionally or alternatively, the control subsystem can include more than 2 controllers, a single controller, and/or any other components.

In a set of examples, for instance, the $1^{st}$ and $2^{nd}$ sets of controllers include ECUs which are configured with relatively high levels of computing abilities (e.g., relative to watchdog controllers).

In some variations, for instance, the control subsystem includes more than 2 redundant controllers of the same type (e.g., 3 redundant controllers, 4 redundant controllers, etc.).

In some variations, for instance, the control subsystem includes multiple controllers of the same type and then one or more controllers of a different type (e.g., watchdog controller as described below).

Any or all of the controllers can optionally include and/or interface with processing and/or computing capabilities, such that the controllers can compute information, analyze information, compare information, and/or otherwise assist in the detection and/or response to failure. In some variations, for instance, any or all of the controllers include built-in vehicle dynamics models for evaluation. Each controller further preferably has built-in voting and arbitration functions to support a fail-operational architecture and eliminate the risk of a failure (e.g., single point failure, multi-point failure, failure originating at a controller, failure originating outside of the control subsystem) disabling the overall system function.

The controllers preferably interface with redundant power sources, which function to ensure continuous power (e.g., even in the event that a communication bus fails). Additionally or alternatively, the DBW controllers can include and/or interface with any other components.

The control subsystem can optionally additionally include a monitoring controller (equivalently referred to herein as a watchdog controller), which functions to monitors inputs received at (and/or outputs produced by) the other controllers of the control subsystem (e.g., $1^{st}$ set of controllers described above, $2^{nd}$ set of controllers described above, etc.). For instance, in an event that the other controllers are receiving and/or providing different information (e.g., giving different control commands to the watchdog controller), the watchdog controller can determine and/or trigger an appropriate action for the vehicle (e.g., come to a stop, execute an MRC, etc.). The watchdog controller can additionally or alternatively function to pass information from the central computing subsystem to the other controllers and/or perform any other functions.

The watchdog controller is preferably of a different type and/or associated with different performance parameters and/or hardware parameters relative to the other controllers. In preferred variations, for instance, the watchdog controller is more physically rugged and of a higher safety performance (e.g., ASIL-D rated, automotive grade, safety-critical, stronger, more resistant to breakage, able to withstand higher temperatures and/or physical perturbations, etc.) and/or less computationally sophisticated (e.g., capable of less processing, more resistant to computational errors, etc.) relative to the other controllers, which can minimize the chance that the watchdog controller fails, enable there to be a single watchdog controller in the control subsystem, and/or otherwise confer any other benefits.

In specific examples, for instance, the watchdog controller is a safety-critical, automotive grade (e.g., Automotive Safety Integrity Level [ASIL] rated, ASIL-D rated, etc.) controller (e.g., ECU) with lower and/or more limited computational abilities (e.g., passing information, comparing outputs from other controllers, etc.) relative to the other controllers of the control subsystem.

Alternatively, the watchdog controller can be of the same type and/or capabilities as the other controllers, have higher intelligence than the other controllers, and/or be otherwise configured.

In variations including a watchdog controller, the control subsystem preferably includes a single watchdog controller, but can additionally include multiple watchdog controllers.

In a first variation (e.g., as shown in FIG. 4), a watchdog controller (e.g., safety-critical, ASIL D-rated ECU, automotive grade ECU, etc.) with high reliability and availability (e.g., reliable communication, minimal processing tasks, etc.) is implemented as a separate ECU relative to the other ECUs and functions to perform safety-critical functions such as fault monitoring, fault management, diagnostics, executing fallback actions (MRCs), and guaranteeing operation of the AV to a safe state. The watchdog ECU can additionally continuously plan the minimal risk maneuvers and/or other failure responses and also thwart attacks by performing cybersecurity activities. The entire chain of events from sensor inputs to execution of controls by the vehicle is preferably under the monitoring control of the watchdog. Based on the severity levels of the failures/faults, they can be accordingly raised to the watchdog controller, at which its monitoring algorithms decide on a course of corrective action to be taken by the autonomous vehicles. Redundant power sources can be implemented as necessary to ensure continuous power.

Additionally or alternatively, any or all of these functions can be performed by the other controllers, by the central computing subsystem, and/or otherwise performed.

In a set of examples (e.g., as shown in FIG. 4), the watchdog controller can function to pass information from the central computing subsystem to the other controllers, monitor inputs being received at the other controllers (e.g., detecting that a failure is present if there is a mismatch in inputs being sent to the other controllers), monitor outputs produced by the other controllers (e.g., detecting that a failure is present if there is a mismatch in outputs being produced by the controllers), selecting which controller to use in passing control commands to the driving subsystem, and/or be otherwise suitably used. In an event that the watchdog controller can not be used (e.g., due to a failure), the other controllers can receive information directly from the central computing subsystem (e.g., in addition to triggering a failure response, instead of initiating a failure response, etc.). Additionally or alternatively, the other controllers can always receive information from the central computing subsystem and/or can be otherwise suitably used.

Alternatively, the control subsystem can be implemented in absence of a watchdog controller.

In a second variation (e.g., as shown in FIG. 5), an architecture between multiple controllers (e.g., $1^{st}$ set of controllers and $2^{nd}$ set of controllers) and multiple computers is created that allows for fault diagnosis and arbitration behavior without the use of additional monitoring hardware (e.g., watchdog controller). This architecture confers redundancy by each controller comparing its own outputs and/or inputs from the computers with the other controller(s) (e.g., its paired component in a subset of 2 controllers). Effectively, each controller provides a check on its partner and on neighboring controllers of different functionalities. Any single point of failure is thus diagnosable and redundantly covered. To check output consistency, for instance, each controller compares its output against the output of the other controller(s), to see that the timing and value of the command match and/or otherwise lie within predetermined boundaries. Should the outputs or inputs not match, each controller is able to institute a failure response (e.g., defined Minimum Risk Condition (MRC), predetermined failure response, etc.). As such, preferably only one component is needed to trigger a failure response. The controller can optionally trigger a failure response without requiring confirmation and/or initiation from the high-level computing subsystem. Additionally or alternatively, the high-level computing subsystem can trigger the failure response, and/or the controllers can be otherwise suitably configured.

In a set of examples (e.g., as shown in FIG. 5), for instance, the $1^{st}$ set of controllers is able to receive information from each of a set of multiple computers, and the $2^{nd}$ set of controllers is also able to receive information from each of the set of multiple computers, where the $1^{st}$ set of controllers can compare the information it receives with the information that the $2^{nd}$ set of controllers receives, thereby enabling a failure with one of the computers to be detected (e.g., if the different controllers receive different information from a computer), and/or a failure with one of the controllers to be detected (e.g., if the different controllers receive the same information from the computers but produce different outputs).

Additionally or alternatively, the control subsystem 120 can include any other components and/or be otherwise suitably configured.

3.3 System—Central Computing Subsystem 130

The system 100 preferably includes a central computing subsystem 130 (equivalently referred to herein as an autonomous vehicle (AV) computing subsystem, a high-level computing subsystem, and/or a central computing subsystem), which functions to perform computing for the decision-making and operation (e.g., perception tasks, prediction tasks, path planning, generating trajectories, etc.) of the autonomous vehicle. The AV computing subsystem further preferably functions to detect at least a portion of failures associated with the vehicle and/or the vehicle's susceptibility to failure (e.g., due to environmental conditions). Additionally, the AV computing subsystem can function to determine (e.g., select) and initiate failure responses (e.g., commensurate failure responses, optimal failure responses, etc.) associated with the detected failures.

Additionally or alternatively, the AV computing subsystem can perform any other suitable functions.

The AV computing subsystem is preferably configured to detect and/or respond to (e.g., individually, collectively with other subsystems, etc.) high-level failures associated with the vehicle, such as failures and/or susceptibility to failures originating from the AV sensor subsystem and/or any other failures requiring high-level computing for detection (e.g., evaluation with a set of trained models, processing with high compute algorithms, etc.). Additionally or alternatively, the AV computing subsystem can be configured to detect and/or respond to high criticality failures, moderate criticality failures, low criticality failures, failures requiring immediate intervention, failures not requiring intermediate intervention (e.g., enabling further monitoring of the failure, enabling more sophisticated failure responses such as communication with a human operator and/or re-routing of the vehicle, etc.), and/or any other failures or combination of failures.

The data flowing across the system (e.g., central computing subsystem, central computing subsystem and subsystems collectively, etc.) is preferably distributed and/or sharded. The result of this data distribution/partitioning is that the data is scalable, has low latency and yet there is enough information distributed across subsystems to enable independent decision-making on operation tasks. The type of data includes that from various computes, various sensors, communications switches, and/or other capabilities and functionalities distributed throughout subsystems. Additionally, this information can also include the entire chain of events from sensor inputs to execution of controls. Additionally or alternatively, any other data can be received at and/or processed by the AV computing subsystem.

Additionally, the AV computing subsystem can function to provide permissions enabling subsystems to trigger failure responses.

The AV computing subsystem is further preferably configured to perform the normal, routine decision-making (e.g., action selection, trajectory generation, etc.) associated with operation of the vehicle, such as, but not limited to, any or all of that described in any or all of: U.S. application Ser. No. 17/116,810, filed 9 Dec. 2021, U.S. application Ser. No. 17/125,668, filed 17 Dec. 2020, and U.S. application Ser. No. 17/127,599, filed 18 Dec. 2020, each of which is incorporated herein in its entirety by this reference.

Figure 6:
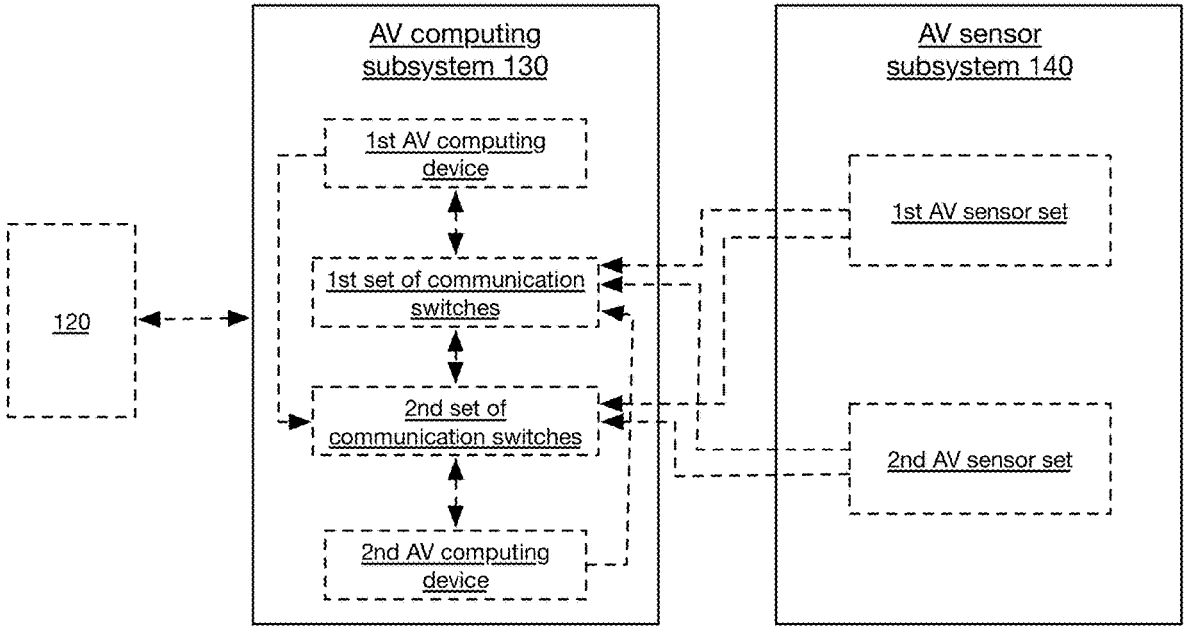
FIG. 6 is a schematic variation of an AV computing subsystem in communication with an AV sensor subsystem.

The AV computing subsystem is preferably in communication (e.g., via the communication subsystem) with at least the control subsystem 120 and the AV sensor subsystem 140 (e.g., as shown in FIG. 6), but can additionally or alternatively be absent of communication with one or more subsystems, in communication with any other components (e.g., any or all other subsystems), and/or otherwise communicable with other parts of the system.

Additionally, the AV computing subsystem can be in communication with any or all controllers of the control subsystem, a portion of controllers, a specific subset of controllers (e.g., watchdog controller), no controllers, and/or any combination of controllers.

The AV computing subsystem preferably includes a set of multiple computing devices, such as a set of two computers, but optionally more than two or less than two. The computing devices are preferably redundant in operation and can be of the same type, different types, or any combination.

In a preferred set of variations, for instance, the computing subsystem includes multiple computers that are redundant in operation and each process data from the AV sensor subsystem. The computers process the sensory information (data) in a sharded/distributed manner in order to perceive the world and issue actuator control messages for the driving subsystem to fulfill. With information/data sharding, AV functions such as perception, prediction, trajectory planning, and controls can optionally be handled by each computer independently, or in-sync with the help of voting and arbitration functions built in to support a fail-operational architecture. Redundant power sources are preferably used to ensure continuous power.

Additionally or alternatively, the computing devices can be otherwise configured.

Further additionally or alternatively, the AV computing subsystem can include a single computer, computers of different types and/or functionalities, and/or any other computing devices.

The system can optionally further include and/or interface with a set of switches (e.g., ethernet switches), such as high-reliability, high-availability switches which are capable of high-speed data transfer between the AV sensors, computing subsystem, and/or any other components. Each switch preferably has its own built-in diagnostics capabilities, but can additionally or alternatively be otherwise configured.

In a set of variations, the set of switches includes automotive-grade, switch-on-a-chip (SOC) networking switches that have built-in, fail-operational capabilities and form a redundant architecture. Redundant power sources are optionally used to ensure continuous power.

Additionally or alternatively, the computing subsystem 130 can include and/or interface with any other components.

3.4 System—AV Sensor Subsystem 140

The system 100 includes an AV sensor subsystem 140, which functions to receive information associated with the environment of the vehicle, which can be further used for any or all of: processing by the computing subsystem 130 (e.g., for autonomous vehicle decision-making, etc.), detection of a set of failures (e.g., by the computing subsystem, by other subsystems, etc.) and/or potential failures (e.g., such that an appropriate MRC can be triggered), normal operation of the autonomous vehicle (e.g., navigation along a route, action selection, trajectory generation, etc.), and/or any other purposes.

The AV sensor subsystem is preferably in communication with the computing subsystem 130 (e.g., via the communication subsystem), but can additionally or alternatively be in communication with any other components of the system (e.g., any or all other subsystems).

The AV sensor subsystem preferably includes a set of sensors configured to collect environmental information associated with the autonomous vehicle, such as, but not limited to: the presence and/or proximities of other objects (e.g., other vehicles, road signs, pedestrians, static objects, dynamic objects, etc.); the type(s) of objects (e.g., vehicle vs. pedestrian vs. inanimate object, etc.) in the vehicle's environment; other features (e.g., road features, road geometry, road types, lane line locations and/or types, etc.) of the vehicle's environment; and/or any other information.

In preferred variants, for instance, the AV sensor subsystem is part of and/or defines the perception module (equivalently referred to herein as perception subsystem) of the autonomous vehicle.

Sensors of the AV sensor subsystem can include, but are not limited to, any or all of: cameras (e.g., visual range, multispectral, hyperspectral, IR, stereoscopic, etc.), light detection and ranging (lidar) sensors, radio detection and ranging (radar) sensors, orientation sensors (e.g., accelerometers, gyroscopes, altimeters), acoustic sensors (e.g., microphones), optical sensors (e.g., photodiodes, etc.), temperature sensors, pressure sensors, flow sensors, vibration sensors, proximity sensors, chemical sensors, electromagnetic sensors, force sensors, sensors which are in communication with an OBD port or other Original Equipment Manufacturer (OEM) system, telematic sensors, and/or any other type(s) of sensors.

In a preferred set of variations, the AV sensor subsystem 140 includes a first subset of sensors and a second subset of sensors which are redundant (e.g., of the same type, with the same sensing region, etc.) or at least partially redundant (e.g., having partially overlapping FOVs) from a field of view (FOV) perspective. Further preferably, through the use of multimodal sensors (e.g., sensors of multiple types), the dependency on any one sensor type is reduced. Data sharding/distribution can ensure that the same quality of AV sensor data all around the vehicle (redundant FOV coverage) is available at all times throughout the system. This information includes the entire chain of events from sensor inputs to execution of controls. In specific examples, at a minimum, under any failure circumstance each set of sensors provides enough information to execute a minimal risk maneuver and bring the vehicle to a safe state. Redundant power sources are preferably used to ensure continuous power. Additionally or alternatively, the sensors can be otherwise configured.

In the event that all sensors fail, the computing subsystem 130 is preferably configured to perform decision-making accordingly (e.g., executing a predetermined failure response that can be implemented absent of sensor data).

3.5 System—Power Subsystem 150

The system 100 can optionally include and/or interface with a power subsystem 150, which functions to provide power for any or all components of the system 100, such as but not limited to, any or all of the components within subsystems 110, 120, 130, 140, 160, 170, and/or any other components.

The power subsystem 150 is preferably in communication with (e.g., electrically connected to, connected with a wired connection to, operable to power, etc.) all components of the system that it is operable to power (e.g., all hardware components, all electronic components, etc.). Additionally or alternatively, the power subsystem can be in communication with any other components.

The power subsystem 150 preferably implements redundancy through at least the hardware components of the power subsystem, such as a redundancy in power sources (e.g., multiple power sources, different types of power sources, multiple batteries, etc.), redundancy in electrical connections between the power subsystem and the other components, any combination, and/or any other redundancies. Additionally or alternatively, the power subsystem can implement safe electrical architectures for safety critical functions (e.g., Powernet), the intelligent switching between software modules and/or hardware components, diagnoses of electrical components, and/or any other measures can be used to achieve fail-operational power for the vehicle. Additionally or alternatively, the power subsystem can implement and/or interface components which implement software redundancies and/or any other redundancies.

Each power source preferably has adequate power capacity for powering the associated components of the system and enough additional power capacity (e.g., power backup) such that one or more types of failure responses can be executed (e.g., before all power is lost, without components executing a failure response losing power, etc.). Additionally or alternatively, the power sources can be associated with any other power capacities.

A switching mechanism that changes power sources from one part of the power subsystem to another (e.g., one electrical bus to another) is preferably implemented, which confers the benefits of high reliability and availability. Additionally or alternatively, the power source(s) can be otherwise configured, associated with switching mechanisms of any other subsystems, and/or be otherwise configured.

In a preferred set of variations, the power subsystem 150 includes multiple power sources, including at least primary and secondary power sources, which function to power at least the driving subsystem and control subsystem, and optionally any other components of the system 100.

In a first specific example, the multiple power sources (e.g., first and second power sources) are of the same type (e.g., same type of battery, rechargeable batteries, non-rechargeable batteries, etc.) and/or associated with the same performance parameters. In a second specific example, the multiple power sources (e.g., first and second power sources) are of different types and/or associated with different performance parameters.

Additionally or alternatively, the power subsystem can be otherwise suitably configured and/or perform any other suitable functions.

3.6 System—Communication Subsystem 160

The system 100 can optionally include and/or interface with a communication subsystem 160, which functions to establish communication—and further preferably redundant communication—among any or all of the components of the system 100.

As such, the communication subsystem 160 is preferably in communication with (e.g., operable to provide communication capabilities for) and/or distributed among at least a portion of the subsystems of the system (e.g., all components of these subsystems, communication components of these subsystems, etc.), and further preferably in communication with and/or distributed among all subsystems of the system.

The communication subsystem further preferably enables (e.g., establishes) communication (e.g., information exchange) between and/or among any or all of: subsystems of the system, components within a subsystem (e.g., between components of the driving subsystem), and/or any other parts of the system.

The communication subsystem can additionally or alternatively be distributed among subsystems and/or components of the system, such as in the presence of communication switches between components of other subsystems.

The communication subsystem can be of any suitable network type (e.g., network protocol), such as: Automotive Ethernet, Controller Area Network (CAN), Local Interconnect Network (LIN), any other network types, and/or any combination of networks.

In a preferred set of variations, the communication subsystem includes a CAN gateway module that bridges the different CAN networks of the driving subsystem and/or other subsystems of the vehicle while simultaneously integrating the computing subsystem over ethernet. Redundant power sources can be used to ensure continuous power.

Additionally or alternatively, the communication subsystem 160 can be otherwise configured.

3.7 System—Vehicle Chassis Subsystem 170

The system 100 can optionally include and/or interface with a vehicle chassis subsystem 170, which functions to support the vehicle and enable its maneuvering. Additionally or alternatively, the vehicle chassis subsystem 170 can function to identify and/or respond to failures (e.g., involving the vehicle chassis components, involving the driving subsystem components, involving any other components, etc.), and/or can perform any other suitable functions.

The vehicle chassis subsystem 170 is preferably in communication with (e.g., via the communication subsystem) the driving subsystem and optionally additionally or alternatively with any other subsystems and/or components.

In a preferred set of variations, the vehicle chassis subsystem 170 includes and/or interfaces with any or all of: one or more emergency parking brake actuators, one or more powertrain transmission shift actuators, one or more Antilock Braking System (ABS) traction controls and/or stability controls, one or more Advanced Driver Assistance Systems (ADAS), and/or any other components.

The vehicle chassis subsystem can additionally or alternatively include and/or interface with any number of distributed computing systems (e.g., as described below) (e.g., for failure detection, for voting and arbitration, etc.), supplementary sensors (e.g., diagnostic sensors for use in failure detection), and/or any other components.

3.8 System—Distributed Processing and/or Computing Subsystem

The system 100 can optionally include a distributed processing and/or computing subsystem, which functions to enable failures to be detected and optionally responded to by numerous (e.g., any, all, a portion of, etc.) subsystems of the system and/or any components of said subsystems. This can, in turn, configure the system for distributed failure management, thereby enabling failure responses to be targeted, quickly initiated if needed, and/or otherwise optimally implemented.

The distributed processing and/or computing subsystem is preferably arranged in components within one or more subsystems of the system, such as: components of the driving subsystem (e.g., embedded controllers/computers coupled to each of the steering, braking, throttle, and shifting subsystems), components of the chassis subsystem, components of the control subsystem, components of the AV sensor subsystem, components of the communication subsystem, and/or any other subsystems, portions of subsystems, and/or any combination.

In preferred variations, for instance, the data flowing across the central computing subsystem is distributed and/or sharded. The result of this data distribution/partitioning is that the data and/or data processing is scalable, has low latency, and yet there is enough information distributed across subsystems to enable independent decision-making on operational tasks. The type of information/data can include that from various computing subsystems, various sensors, communications switches, and/or other capabilities and functionalities distributed throughout subsystems. Additionally, this information can also include the entire chain of events from sensor inputs to execution of controls.

In a set of specific examples, for instance, this subsystem includes embedded computers (e.g., ECUs) that are integrated within components (e.g., actuators) of the subsystems.

Figure 7:
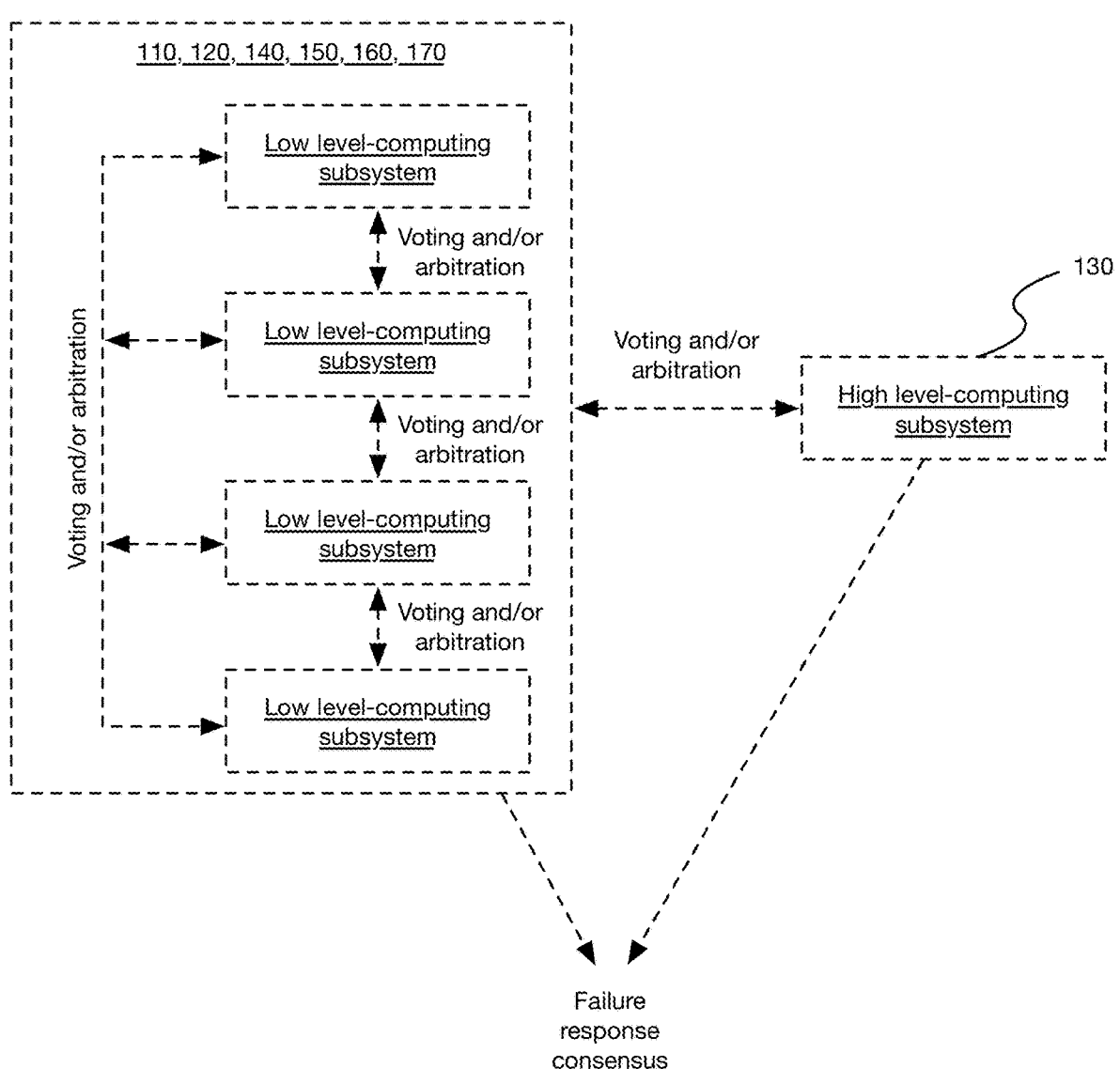
FIG. 7 depicts a variation of reaching a consensus in a failure response among subsystems of the system.

The distributed processing and/or computing subsystem preferably includes lower-level (e.g., having lower computational abilities, having less operational scope/responsibility, having less computational responsibilities, etc.) processors and/or computers relative to the central computing subsystem, but can additionally or alternatively include the same types of computers and/or processors, and/or any combination of computers and/or processors. The processors and/or computers are preferably configured to detect failures associated with their respective subsystems and/or components (e.g., based on data from diagnostic supplementary sensors associated with the respective components), but can additionally or alternatively function to initiate failure responses, take part in voting and/or arbitration (e.g., with other subsystems in the selection and/or initiation and/or approval of a failure response, as shown in FIG. 7, etc.), transmit data to other subsystems (e.g., central computing subsystem), and/or take part in any other functions.

The distributed processing and/or computing subsystem is preferably in communication with the central computing system, where the central computing subsystem uses the processed data from these lower-level computers to gain an understanding of (e.g., monitor) what is happening throughout the system. Additionally the central computing subsystem can optionally aggregate and/or otherwise process the information from these distributed computers and initiate responses if errors and/or anomalies are detected.

The distributed processing and/or computing subsystem can optionally additionally or alternatively receive commands and/or other information from the central computing subsystem (e.g., approval for initiating a failure response). The distributed computers and/or processors are further preferably configured to trigger a subset of failure responses (e.g., predetermined subset of failure responses specific to the associated components) on their own (e.g., absent of approval from one or more other subsystems), such that certain failures (e.g., high criticality failures, failures only relevant to that subsystem, failures most relevant to that subsystem, etc.) can be initiated with low latency and/or in a timely manner.

Additionally or alternatively, the distributed processing and/or computing subsystem can include any other components and/or be otherwise suitably configured.

3.9 System—Supplementary Sensor Subsystem

The system can optionally include and/or interface with a supplementary sensor subsystem, which functions to detect errors and/or anomalies with any or all components of the system. Sensors of the supplementary sensor subsystem are preferably distributed among any or all of the system's subsystems, but can additionally or alternatively be otherwise arranged.

The supplementary sensors preferably include diagnostic and/or health monitoring sensors, such as sensors which detect inputs received at and/or outputs produced at one or more actuators (e.g., of the driving subsystem) or other components of the system, such that in an event that a mismatch occurs between the output value and a desired value (and/or if the output value falls outside of a predetermined range), a failure can be detected. As such the supplementary sensors (e.g., in combination with the distributed processors and/or computers) can function to enable individual subsystems to identify and respond to failures. Additionally or alternatively, the supplementary sensors can include any other sensors.

Additionally or alternatively, the sensor subsystem can include any other sensors.

4. Method 200

As shown in FIG. 2, the method 200 can include any or all of: detecting and responding to a failure S100; and operating the vehicle S200. Additionally or alternatively, the method 200 can include any other processes. Further additionally or alternatively, the method 200 can include and/or interface with any or all of the methods, processes, embodiments, and/or examples as described in any or all of: U.S. application Ser. No. 17/116,810, filed 9 Dec. 2021, U.S. application Ser. No. 17/125,668, filed 17 Dec. 2020, U.S. application Ser. No. 17/127,599, filed 18 Dec. 2020, U.S. application Ser. No. 17/962,459, filed 7 Oct. 2022, and U.S. application Ser. No. 18/075,778, filed 6 Dec. 2022, each of which is incorporated herein in its entirety by this reference.

The method 200 is preferably performed in accordance with a system 100 as described above, but can additionally or alternatively be performed with any other suitable system (s).

The method 200 functions to detect and optimally respond to failures which may occur to and/or affect any or all of the components of the system (e.g., as described above). Even with highly redundant systems, there are certain failures that can occur that reduce the performance of the AV system. In such a case, the vehicle can be optimally operated in a fail-safe or fail-operational manner, which allows the vehicle to take the most appropriate response actions based on the severity level and/or type and/or source of the failure, such that the AV system reaches a safe state. A safe state herein refers to a reduced operating mode where the vehicle is in a state of least (and/or minimized) risk to itself and other road users. This response action is preferably linked to a maneuver or action that can be achieved by the DBW subsystem (equivalently referred to herein as a motion control subsystem and/or motion control system) depending on the particular failure. Additionally or alternatively, a minimum risk condition (MRC) can be executed such that under all conditions, a safe state can be guaranteed. Online and offline diagnostics and a tiered fault management system across the individual elements of the system, for instance, are some ways in which MRC redundancy can be implemented.

Additionally or alternatively, the method 200 can perform any other functions.

4.1 Method—Detecting and Responding to a Failure S100

The method 200 can include detecting and responding to a failure S100, which functions to monitor the vehicle for failure and optimal response based on the type and/or features associated with the failure. This can, in turn, function to enable any or all of: maintaining progress of the vehicle toward a goal, maintaining a highest fail-operational status of the vehicle, maintaining and/or exceeding safety standards associated with the vehicle, and/or any other functions.

A failure is preferably checked for continuously (e.g., at a predetermined frequency) during operation of the vehicle, but can additionally or alternatively be detected at an alternative interval.

Failures are preferably checked for at multiple subsystems (e.g., in parallel, in series according to a prioritization, with distributed computing, etc.), but can additionally or alternatively be checked for with any other subsystems.

In preferred variations, S100 functions to prevent overburdening of any individual subsystems by utilizing a shared and distributed arrangement/architecture for failure management.

S100 can include any or all of: detecting a failure S110; characterizing a failure S120 (e.g., performing a failure analysis process, identifying a particular component/source of the failure, identifying if there is backup hardware, etc.); triggering an action based on the failure S130 (e.g., triggering/activating backup hardware, determining and/or selecting logic to optimally operate the vehicle in a fail-operational status, selecting and/or implementing a failure response (e.g., MRC, further monitoring, selection of a redundant component to use, etc.); and/or any other processes.

The failure types detected in S110 are preferably nuanced and numerous (e.g., along spectrums of severity, type, criticality, etc.), where each failure type can have a unique response, overlapping responses, and/or any other suitable responses.

In such cases, the AV computer(s) can optionally be made aware of the detected failure (e.g., prior to initiation of a failure response by the distributed computer, after initiation of a failure response by the distributed computer, absent of initiation of a failure response by the distributed computer, etc.), where the AV computer can optionally take action (e.g., further action in addition to action by the sub-computer, action instead of that taken by the sub-computer, the execution of a more sophisticated minimal risk condition, etc.). Alternatively, the distributed computer(s) can take action on their own (e.g., for high criticality failures, for emergencies where latency is of critical importance, etc.), effectively circumventing the AV computer(s).

Other examples of failure detection can include, but are not limited to: failure of individual components, failure of collective components, detection that AV sensor data is out-of-distribution (e.g., out of range, outside of predetermined bounds, outside of predetermined acceptable limits, outside of acceptable latencies, etc.), detection that the vehicle's environment is unknown and/or risky, and/or any other failures.

The failure responses can be any or all of: individually initiated (e.g., by a single subsystem and/or component), collectively initiated (e.g., through voting and/or arbitration and/or approval from multiple subsystems, through approval from the AV computing subsystem, etc.), and/or otherwise initiated.

Determining (e.g., selecting) the failure response and how it is initiated are preferably determined based on features associated with the failure, such as: the failure type, which components are associated with and/or affected by the failure, a severity and/or criticality of the failure, and/or any other features and/or combination of features.

For instance, depending on the criticality of the detected failure, different tiers and/or types of responses can be triggered. For extreme critical failure (e.g., brakes give out), the subsystem can preferably act in a low latency manner and bring the vehicle to a stop without (and/or prior to) approval from other parts of the system. If the failure is not critical and/or moderately critical, the subsystem that first detects the failure can send the information to other subsystems, such as the AV computing subsystem, and allow the AV computing subsystem to determine next steps (e.g., continue to monitor the failure, implement a sophisticated MRC, etc.).

Additional or alternative to criticality, the number of components and/or subsystems affected to the failure can be taken into account in determining and/or initiated a failure response (e.g., driving subsystem can solely determine and initiate a failure response for failures that only affect the driving subsystem, the AV computing subsystem can determine and initiate failure responses for failures that affect numerous subsystems, subsystems can collectively determine and/or initiate failure responses—such as through a voting and/or arbitration and/or consensus process—for failures that affect numerous subsystems, etc.), and/or the subsystems can otherwise work together and/or independently in determining and/or triggering actions in response to failure.

The failure responses are preferably predetermined (e.g., hard-coded), such that determining which components take action, in what failure types the components take action, which subsystems need to provide approval in implementing an action, and/or any other parts of the action implementation are predetermined. This can be enabled, for instance, through a limited domain associated with the vehicles (e.g., fixed route use case).

Additionally or alternatively, any or all of the responses can be dynamically determined (e.g., with trained models and/or algorithms).

Examples of failure responses can include, but are not limited to, any or all of: a warning transmitted within the system and/or outside the system (e.g., to a remote operator), the selection and/or activation of another component (e.g., implementation of a redundant component, etc.), transmitting of a notification (e.g., to a remote operator, to a human operator, etc.), implementation of an MRC (e.g., new trajectory, coming to a stop, slowing down, etc.), waiting and/or doing nothing (e.g., until further information is received, until a confidence value associated with the failure exceeds a predetermined threshold, until consensus is reached among a minimum number of subsystems, until the vehicle has completed a trip, etc.), and/or any other responses. In preferred variations, for instance, the failure responses are nuanced and specific such that not everything results in the vehicle coming to a stop, thereby preventing overly conservative, prohibitive, and/or otherwise undesirable driving behavior.

In a first set of variations, for certain failures, at least a portion of the subsystems (e.g., predetermined subsystems based on failure type, all subsystems, etc.) are required to agree on initiation of the failure response, thereby preventing any one subsystem from prematurely and/or erroneously initiating a failure response (e.g., if not needed).

In a second set of variations, additional or alternative to the first, a single subsystem (e.g., subsystem that first detects the failure, subsystem including the component involved in the failure, etc.) can select and initiate the failure response (e.g., for high criticality failures, for failures predetermined to need to immediate intervention, etc.).

In a third set of variations, additional or alternative to those above, the subsystem that detects the failure contacts (e.g., as determined based on the failure type) a specific set of subsystem recipients, wherein the set of subsystem recipients collectively determine and/or initiate the failure response. In specific examples, for instance, if the steering subsystem experiences a failure (e.g., goes out), the braking and throttle subsystems collectively work together to operate the vehicle (e.g., according to a predetermined MRC).

In a fourth set of variations, additional or alternative to those above, for at least certain failure types, a single subsystem is responsible for taking action (e.g., based on which is closest [e.g., physically, electrically, etc.] to the source of the failure, based on which subsystem has the greatest effect on other subsystems, based on which subsystem has the smallest effect and/or smallest cascading effect on other subsystems, etc.). In a first set of examples, the subsystem is responsible for taking the action but after affirmation/approval from specific subsystems (e.g., AV computing subsystem, control subsystem, etc.). In a second set of examples, the subsystem is responsible for taking the action without requiring approval (e.g., for high criticality errors, for high severity errors, for low severity errors, etc.).

Additionally or alternatively, S100 can include any other suitable processes.

4.2 Method—Operating the Vehicle S200

The method 200 can include operating the vehicle S200, which functions to operate the vehicle optimally according to the failure determined in S100. Additionally or alternatively, S200 can function to operate the vehicle in absence of a failure (e.g., wherein S200 is performed prior to S100, in absence of S100, etc.) and/or perform any other functions.

S200 preferably includes operating the vehicle according to the failure response (e.g., AV logic) as determined in S100 (e.g., in a fail-operational status), but can additionally or alternatively include operating the vehicle in a fail-safe status, operating the vehicle in absence of a detected failure, and/or otherwise operating the vehicle.

5. Variations

In a preferred variation, the method 200 includes detecting an error or potential risk associated with the vehicle and/or any of its subsystems; assessing, via any or all of the computing and/or processing subsystems (e.g., distributed computing/processing subsystems, central computing subsystem, etc.) of the vehicle, the error or potential risk; determining a categorization (e.g., classification, severity, etc.) of the error or potential risk; and triggering a suitable (e.g., predetermined) action based on the categorization.

In a first set of examples, the method 200 includes classifying the error or potential risk as being of a high severity (e.g., having a severity above a predetermined threshold), and initiating a predetermined fail-safe action (e.g., minimal risk maneuver that takes the vehicle to an immediate stop) in response.

In a particular specific example, as additional information is collected, the method 200 can include dynamically determining that de-escalation of the fail-safe action (e.g., into a fail-operational action) is suitable for the vehicle (e.g., due to a decrease in calculated severity of the error, due to a potential risk being eliminated as the vehicle's environment changes, etc.). In a demonstrative example, for instance: a failure is detected at time t=0, leading to the vehicle selecting and triggering a fail-safe behavior (e.g., initiation of a minimal risk maneuver in which the vehicle drives and parks at the side of the road); the vehicle addresses and tries to rectify a root cause of the failure (e.g., switching which actuators are being used, further processing perception information, etc.) (e.g., without human input, with teleoperator input, etc.); the vehicle successfully rectifies the fault, such as with any or all of: a reset of the subsystem associated with the failure, a natural removal of the fault (e.g., as the vehicle's environment changes), built-in self-tests and/or self-diagnostics of components of the system, and/or any other actions; and the vehicle initiates, in response to detecting this rectification of the fault, a fail-operational (e.g., degraded capability) state in which a different action (e.g., predetermined action) can be triggered (e.g., driving back to a home base associated with the vehicle).

In a second set of examples, the method 200 includes classifying the error or potential risk as being of a moderate and/or low severity (e.g., having a severity below one or more predetermined thresholds), and initiating a predetermined fail-operational action (e.g., switching to a backup actuator) in response.

In a particular specific example, as additional information is collected, the method 200 can include dynamically determining that escalation of the fail-operational behavior (e.g., into a fail-safe action) is suitable for the vehicle (e.g., due to an increase in calculated severity of the error, due to a potential risk escalating in severity as the vehicle's environment changes, etc.). In a demonstrative example, for instance: the vehicle detects a failure at time t=0, leading to the vehicle selecting and triggering a fail-operational behavior (e.g., continuing operation along route in a degraded mode such as with the utilization of one or more backup components and/or without one or more components); the vehicle addresses and tries to rectify a root cause of the failure (e.g., switching which actuators are being used, further processing perception information, etc.) (e.g., without human input, with teleoperator input, etc.); the vehicle is unsuccessful at rectifying the fault and determines that the failure is uncorrectable and initiates a progression toward escalation of the failure response; and the vehicle initiates an escalation to a fail-safe action (e.g., coming to a safe stop at the side of the road).

Additionally or alternatively, the method 200 can be otherwise suitably performed.

Additionally or alternatively, the method 200 can include any other suitable processes.

Although omitted for conciseness, the preferred embodiments include every combination and permutation of the various system components and the various method processes, wherein the method processes can be performed in any suitable order, sequentially or concurrently.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

Additional or alternative embodiments implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPU, GPUs, TPUs, microprocessors, or ASICs, but the instructions can alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

We claim:

1. A method for targeted failure management of an autonomous vehicle, the method comprising, at an autonomous vehicle:

during a trip, checking for a $1^{st}$ set of failures with a high-level processing subsystem configured to process environmental information from an environmental sensor subsystem;

checking for a $2^{nd}$ set of failures with a set of distributed processing subsystems arranged within a set of vehicle subsystems of the autonomous vehicle, the set of vehicle subsystems comprising at least one of:

the environmental sensor subsystem;

a control subsystem;

a drive-by-wire subsystem comprising a set of actuators; or a vehicle chassis subsystem;

in response to detecting one or more of the $1^{st}$ set of failures, triggering one of a $1^{st}$ set of failure responses, wherein at least a portion of the $1^{st}$ set of failure responses comprises waiting until the autonomous vehicle has completed the trip before triggering an action; and in response to detecting one or more of the $2^{nd}$ set of failures, triggering one of a $2^{nd}$ set of failure responses.

2. The method of claim 1, wherein the one or more of the $1^{st}$ set of failures is detected based on uncertainty values for the environmental information.

3. The method of claim 1, wherein the high-level processing subsystem comprises:

a first high-level computing subsystem configured to determine a first trajectory;

a second high-level computing subsystem configured to determine a second trajectory; and a control subsystem comprising:

a first controller configured to determine a first control instruction based on the first trajectory and the second trajectory; and a second controller configured to determine a second control instruction based on the first trajectory and the second trajectory; and wherein the autonomous vehicle is configured to operate based on the first control instruction and the second control instruction.

4. The method of claim 3, wherein the control subsystem is configured to compare the first trajectory to the second trajectory, and wherein the first controller is configured to determine the first control instruction based on the comparison of the first trajectory to the second trajectory.

5. The method of claim 4, wherein the control subsystem is further configured to compare the first control instruction to the second control instruction, and wherein the autonomous vehicle is operated based on the comparison of the first control instruction to the second control instruction.

6. The method of claim 1, wherein the one of a $1^{st}$ set of failure responses is determined based on a location of the autonomous vehicle.

7. The method of claim 1, wherein the one or more of the $1^{st}$ set of failures is separate and distinct from the one or more of the $2^{nd}$ set of failures, and wherein the $1^{st}$ set of failure responses is separate and distinct from the $2^{nd}$ set of failure responses.

8. The method of claim 1, wherein the one of the $2^{nd}$ set of failure responses is determined based on a magnitude of the one or more of the $1^{st}$ set of failures.

9. The method of claim 1, further comprising reaching consensus between a threshold subset of the vehicle subsystems before triggering one of the $2^{nd}$ set of failure responses.

10. The method of claim 1, wherein a failure response within the $2^{nd}$ set of failure responses comprises entering a minimal risk condition (MRC).

11. An autonomous vehicle, comprising:

a high-level processing system configured to:

check for a set of high-level failures based on a set of autonomous vehicle data; and when a high-level failure is detected during a trip, wait until the autonomous vehicle has completed the trip before triggering a first response action; and a set of vehicle subsystems, each comprising a low-level processing system configured to:

check for a set of low-level failures based on data from the respective vehicle subsystem; and when a low-level failure is detected during the trip, trigger a second of response action during the trip.

12. The autonomous vehicle of claim 11, wherein the high-level failure is detected based on uncertainty values for information collected by a vehicle subsystem of the set of vehicle subsystems.

13. The autonomous vehicle of claim 11, wherein the high-level processing system comprises:

a set of redundant high-level computing subsystems, each configured to determine a trajectory for the autonomous vehicle based on shared information from the set of vehicle subsystems;

a control subsystem comprising a set of redundant controllers, each configured to determine a control instruction set based on the trajectories determined by the redundant high-level computing subsystems;

wherein the autonomous vehicle is controlled based on each of the control instruction sets.

14. The autonomous vehicle of claim 13, wherein the control subsystem further comprises a watchdog controller configured to selectively determine a third response action based on a comparison between the control instruction sets generated by the set of redundant controllers.

15. The autonomous vehicle of claim 11, wherein the second response action is determined based on a geolocation of the autonomous vehicle.

16. The autonomous vehicle of claim 11, wherein the first response action is determined based on a geolocation of the autonomous vehicle.

17. The autonomous vehicle of claim 11, wherein at least one of the set of high-level failures or the set of low-level failures are determined based on a geolocation of the autonomous vehicle.

18. The autonomous vehicle of claim 11, wherein the second response action is determined based on a magnitude of the low-level failure.

19. The autonomous vehicle of claim 11, wherein consensus from a threshold subset of the set of vehicle subsystems is required before triggering the second response action.

20. The autonomous vehicle of claim 11, wherein the second response action comprises entering a minimal risk condition (MRC).

\* \* \* \* \*